US010496964B2

(12) United States Patent
Zimmerman et al.

(10) Patent No.: US 10,496,964 B2
(45) Date of Patent: Dec. 3, 2019

(54) ROUTING PAYMENTS TO PAYMENT AGGREGATORS

(71) Applicant: Facebook, Inc., Menlo Park, CA (US)

(72) Inventors: Max Zimmerman, Danville, CA (US); Waseem Ahmad, Houston, TX (US); Yegnashankar Parasuram, Cupertino, CA (US); Alexandre Couturon, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 534 days.

(21) Appl. No.: 14/243,745

(22) Filed: Apr. 2, 2014

(65) Prior Publication Data

US 2015/0286997 A1 Oct. 8, 2015

(51) Int. Cl.
*G06Q 40/00* (2012.01)
*G06Q 20/10* (2012.01)
*G06Q 50/00* (2012.01)

(52) U.S. Cl.
CPC ............. *G06Q 20/10* (2013.01); *G06Q 50/01* (2013.01)

(58) Field of Classification Search
CPC ...................................................... G06Q 40/20
USPC ..................................................... 705/36, 39
See application file for complete search history.

(56) References Cited

U.S. PATENT DOCUMENTS 6,021,397 A 2/2000 Jones et al.
7,689,468 B2 3/2010 Walker et al.
8,886,563 B2 * 11/2014 Sakata .................. G06Q 30/04 235/380
2004/0117302 A1 6/2004 Weichert et al.
2008/0010196 A1 * 1/2008 Rackley III .......... G06Q 20/102 705/40
2009/0119190 A1 * 5/2009 Realini .................. G06Q 20/04 705/30
2012/0284105 A1 11/2012 Li (Continued)

FOREIGN PATENT DOCUMENTS

JP 2001-142982 A 5/2001
WO WO 2015/153155 10/2015

OTHER PUBLICATIONS

Ericsson to provide WAP billing for ZapDance in the UK Nordic Business Report: NA. Normans Media Ltd. (Year: 2006).*

(Continued)

*Primary Examiner* — Bruce I Ebersman
*Assistant Examiner* — John A Anderson
(74) *Attorney, Agent, or Firm* — Keller Jolley Preece

(57) ABSTRACT

Methods and systems for processing payments using payment aggregators are provided. In particular, one or more embodiments comprise an e-commerce payment facilitator that acts as an intermediary between a commerce application and a plurality of payment aggregators. This allows the e-commerce payment facilitator to provide a user with payment methods supported by the plurality of payment aggregators. Furthermore, one or more embodiments enable the e-commerce payment facilitator to route transactions to payment aggregators based on various factors, such as availability, reliability, and profitability. In addition, one or more embodiments provide e-commerce payment facilitators with greater control over the processing of transactions by allowing for the routing and distribution of transactions across multiple payment aggregators.

20 Claims, 16 Drawing Sheets

(56) References Cited

U.S. PATENT DOCUMENTS

| | | | | |
|---|---|---|---|---|
| 2013/0181045 | A1 | 7/2013 | Dessert et al. | |
| 2013/0218738 | A1 * | 8/2013 | Senapati | G06Q 20/12 705/35 |
| 2013/0268434 | A1 | 10/2013 | Mohsenzadeh | |
| 2013/0311375 | A1 * | 11/2013 | Priebatsch | G06Q 30/06 705/44 |
| 2014/0040003 | A1 | 2/2014 | Kothari et al. | |
| 2014/0058927 | A1 | 2/2014 | Schwarzkopf | |
| 2014/0064282 | A1 * | 3/2014 | Basso | H04L 45/7453 370/392 |
| 2014/0129357 | A1 | 5/2014 | Goodwin | |
| 2014/0279458 | A1 * | 9/2014 | Holman | G06Q 20/227 705/40 |
| 2014/0279509 | A1 | 9/2014 | Khilnani | |
| 2015/0032627 | A1 * | 1/2015 | Dill | G06Q 20/385 705/44 |

OTHER PUBLICATIONS

U.S. Appl. No. 13/828,150, Aug. 15, 2014, Office Action.

International Search Report as received in PCT/US2015/021834 dated Jul. 14, 2015.

U.S. Appl. No. 13/828,150, Dec. 4, 2014, Office Action.

Office Action as received in Japanese Application 2016-560456 dated Feb. 26, 2019.

* cited by examiner

400

404

402

| | Payment Aggregator System X | Payment Aggregator System Y | Payment Aggregator System Z |
|---|---|---|---|
| Payment Method A | 30% | 33% | 34% |
| Payment Method B | 50% | 50% | 0% |
| Payment Method C | 100% | 0% | 0% |
| Payment Method D | 25% | 25% | 50% |
| Payment Method E | 10% | 40% | 50% |

| | Mobile Payment Aggregator System X | Mobile Payment Aggregator System Y |
|---|---|---|
| Mobile Payment Method A | 33% | 67% |
| Mobile Payment Method B | 50% | 50% |
| Mobile Payment Method C | 100% | 0% |
| Mobile Payment Method D | 25% | 75% |
| Mobile Payment Method E | 60% | 40% |

*Fig. 4B*

ROUTING PAYMENTS TO PAYMENT AGGREGATORS

CROSS REFERENCE TO RELATED APPLICATIONS

N/A.

BACKGROUND

1. Technical Field

One or more embodiments relate generally to processing payments. More specifically, one or more embodiments relate to methods and systems of processing payments using payment aggregators.

2. Background and Relevant Art

Commerce applications allow users to perform real-world monetary transactions over a communications network. Examples of commerce applications include websites and native applications. Commerce applications allow users to purchase goods and/or services using a checkout process. The checkout process can involve providing a user with various payment methods. Examples of payment methods include traditional payment methods, such as credit/debit cards, and alternative payment methods, such as virtual wallets, mobile phone carrier-billing services, and prepaid stored value cards/vouchers.

Often, a commerce application will use a payment facilitator to perform at least a part of the checkout process. Examples of payment facilitators include e-commerce payment services, social network payment services, and virtual wallet payment services. Payment facilitators ordinarily use a single payment aggregator to process all certain payment methods provided to the user. Examples of payment aggregators include online payment aggregator services and mobile payment aggregator services. Typically, once the user selects a payment method, the commerce application and the payment facilitator will use the payment aggregator to complete the checkout process. Accordingly, the payment aggregator usually obtains payment authorization and securely passes payment information to a payment processor for the user's selected payment method.

While using a payment aggregator can provide a commerce application with access to additional payment methods, one payment aggregator for payment method processing can be inadequate. For instance, a single payment aggregator typically offers a limited number of payment methods and often lacks additional payment methods potentially available to the user through other payment aggregators. It is common that the user wants to use a particular payment method, but that payment method is not supported through the single payment aggregator. As a result, users can become frustrated with the limited number of payment methods available, which can often cause users to abandon their transactions.

A single payment aggregator can also restrict the payment facilitator to the transaction fees offered by the payment aggregator. Usually, the payment facilitator and the payment aggregator agree on transaction fees before the payment facilitator begins using the payment aggregator. However, since the payment facilitator commonly uses a single payment aggregator for processing certain payment methods, this typically limits the ability of the payment facilitator to negotiate better transaction fees with the payment aggregator. Consequently, using a single payment aggregator can become cost-prohibitive or less profitable for the payment facilitator.

Commerce applications, their users, and payment facilitators can also be limited to the reliability and availability of the single payment aggregator that processes certain payment methods. For instance, degradation in the quality of service provided by the single payment aggregator can be caused by an increase in transactions being processed by the payment aggregator. Such degradation can cause commerce applications and payment facilitators to lose business as a result of users abandoning their transactions. As another example, a single payment aggregator can have an unexpected outage or downtime due to regularly scheduled maintenance. Such outages and downtimes can also result in users abandoning their transactions, thereby adversely affecting commerce applications and payment facilitators.

Payment facilitators also lack control over the processing of transactions because payment facilitators typically only use one payment aggregator. For instance, payment facilitators are unable to route transactions to other more profitable or reliable payment aggregators. In some cases, a payment facilitator can overwhelm its lone payment aggregator because the payment facilitator lacks the ability to distribute the workload of transactions. This lack of control can prevent payment facilitators from optimizing the service provided to commerce applications and their users.

Accordingly, there are a number of considerations to be made in payment processing and processing payments using payment aggregators.

SUMMARY

Embodiments provide benefits and/or solve one or more of the foregoing or other problems in the art with methods and systems for improving the routing and processing of payments using payment aggregators. In particular, one or more embodiments facilitate the use of multiple payment aggregators. In particular, one or more embodiments allow for the management of multiple payment aggregators. For example, one or more embodiments provide an e-commerce payment facilitator that controls and distributes transactions between multiple payment aggregators.

Moreover, one or more embodiments can allow payment facilitators to consider numerous transaction fees that apply to particular transactions by providing payment facilitators with the range of transaction fees offered by multiple payment aggregators. Furthermore, one or more embodiments can help improve the profitability of using payment aggregators by enabling payment facilitators to select a payment aggregator for a particular transaction based on the payment aggregator's fees. In addition, one or more embodiments can create competition among payment aggregators, thereby enabling payment facilitators to negotiate and obtain more favorable transaction fees.

Furthermore, one or more embodiments can assist payment facilitators in dealing with the poor reliability and availability of single payment aggregators by providing payment facilitators with backup payment aggregators. In particular, one or more embodiments improve the reliability and availability of processing transactions by providing redundancy in the form of a secondary payment aggregator that can be used as a failover in the event a primary payment aggregator experiences an outage. Accordingly, one or more embodiments can reduce the possibility that transactions will be abandoned as a result of user frustration or system downtime.

Still further, one or more embodiments can provide payment facilitators with greater control over the processing of transactions by providing multiple payment aggregators to choose from on a per-transaction basis. Furthermore, one or more embodiments can enable payment facilitators to route transactions to other more profitable or reliable payment aggregators by allowing payment facilitators to select from numerous payment aggregators. In addition, one or more embodiments can allow payment facilitators to distribute transactions across multiple payment aggregators, thereby avoiding overloading any single payment aggregator.

Additional features and advantages of exemplary embodiments will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. In the following drawings, bracketed text and blocks with dashed borders (e.g., large dashes, small dashes, dot-dash, dots) are used herein to illustrate optional features or operations that add additional features to one or more embodiments. Such notation, however, should not be taken to mean that these are the only options or optional operations, and/or that blocks with solid borders are not optional in certain embodiments. Understanding that these drawings depict only typical embodiments and are not therefore to be considered to be limiting, embodiments will be described and explained with additional specificity and detail through the use of the accompanying drawings in which:

FIGS. 4A-4B illustrate transaction routing tables in accordance with one or more embodiments;

DETAILED DESCRIPTION

Figure 1:
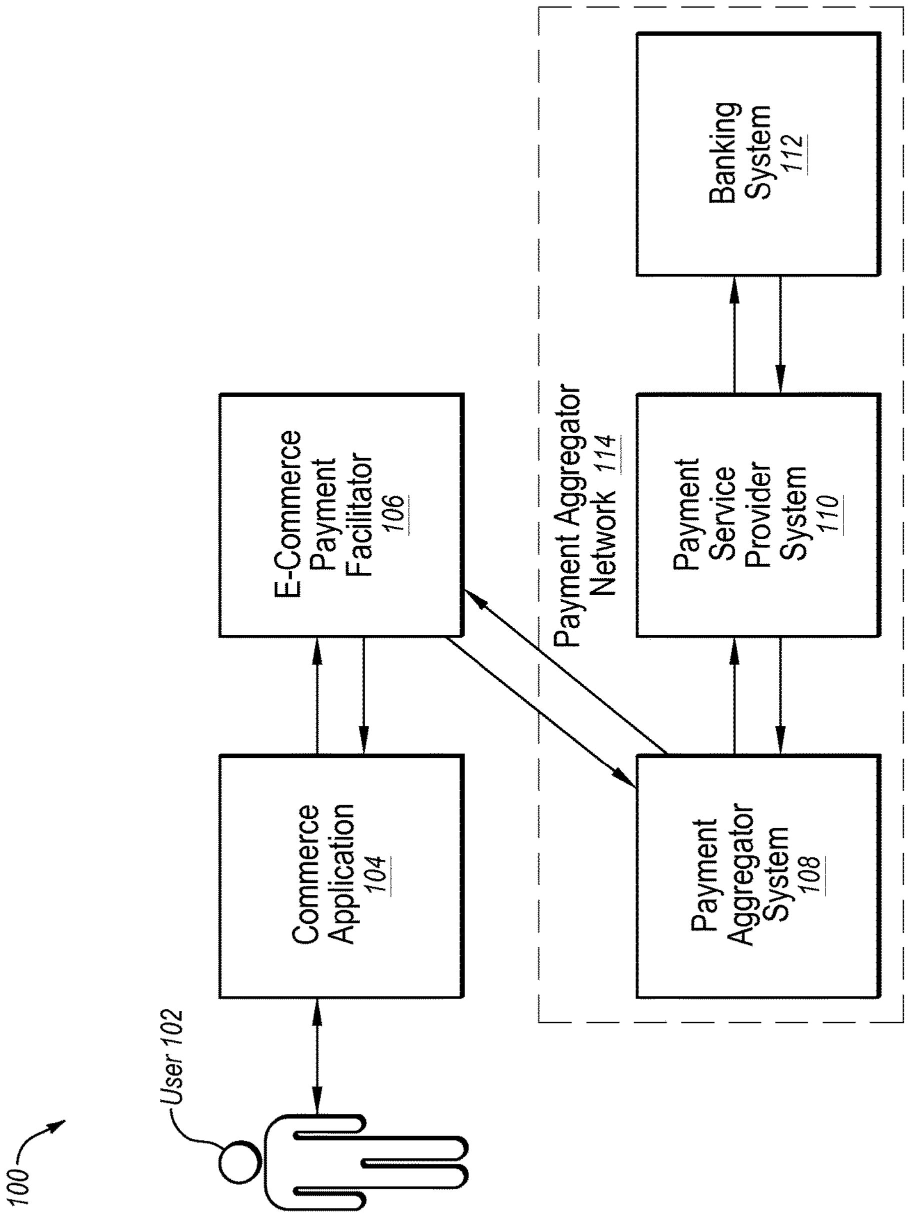
FIG. 1 illustrates a schematic diagram of a system for facilitating a financial transaction using a payment aggregator system in accordance with one or more embodiments.

One or more embodiments improve the routing and processing of payments using payment aggregators. In particular, one or more embodiments include an e-commerce payment facilitator that acts as an intermediary between a commerce application and a payment aggregator system. The e-commerce payment facilitator can establish relationships with multiple payment aggregator systems. This allows the e-commerce payment facilitator to provide a user with the various payment methods supported by the multiple payment aggregator systems. Furthermore, the e-commerce payment facilitator can determine a particular payment aggregator system to process the payment method selected by the user. This allows the e-commerce payment facilitator greater control over the processing of transactions by enabling the routing of transactions to particular payment aggregator systems.

In addition to the foregoing, in one or more embodiments the e-commerce payment facilitator divides or routes transactions to payment aggregators. For example, the e-commerce payment facilitator can route a certain percentage of transactions to a first payment aggregator and a certain percentage of transactions to a second payment aggregator.

One or more embodiments help improve the number of available payment methods by providing a user with additional payment methods offered through multiple payment aggregators. Additionally, one or more embodiments reduce the amount of transactions abandoned by users by increasing the odds a desired payment method is available. The one or more embodiments can provide these and other benefits while allowing the commerce application to process the transaction using its existing relationships.

Moreover, one or more embodiments allow e-commerce payment facilitators to consider numerous transaction fees that apply to particular transactions by providing payment facilitators with the range of transaction fees offered by multiple payment aggregators. Furthermore, one or more embodiments help improve the profitability of using payment aggregators by enabling e-commerce payment facilitators to select a payment aggregator for a particular transaction based on the payment aggregator's fees. In addition, one or more embodiments create competition among payment aggregators, thereby enabling e-commerce payment facilitators to negotiate and obtain more favorable transaction fees.

Additionally, one or more embodiments assist e-commerce payment facilitators in dealing with the poor reliability and availability of single payment aggregators by providing e-commerce payment facilitators with backup payment aggregators. In particular, one or more embodiments improve the reliability and availability of processing transactions by providing redundancy in the form of a secondary payment aggregator that can be used as a failover in the event a primary payment aggregator experiences an outage. Accordingly, one or more embodiments reduce the possibility that transactions will be abandoned as a result of user frustration or system downtime.

Still further, one or more embodiments provide e-commerce payment facilitators with greater control over the processing of transactions by providing multiple payment aggregators to choose from on a per-transaction basis. Furthermore, one or more embodiments enable e-commerce payment facilitators to route transactions to other more profitable or reliable payment aggregators by allowing e-commerce payment facilitators to select from numerous payment aggregators. In addition, one or more embodiments allow e-commerce payment facilitators to distribute transactions across multiple payment aggregators, thereby avoiding overloading any single payment aggregator.

For example, FIG. 1 is a schematic diagram illustrating a system 100 in accordance with an embodiment. An overview of the system 100 will be described next in relation to FIG. 1. Thereafter, a more detailed description of the components and processes of the system 100 will be described in relation to the remaining figures.

As illustrated by FIG. 1, the system 100 can include a user 102, a commerce application 104, an e-commerce payment facilitator 106, and a payment aggregator system 108. The commerce application 104 can interact with the e-commerce payment facilitator 106 to provide user 102 with numerous payment methods that can be routed to, and processed by, the payment aggregator system 108. To complete the financial transaction for the payment method selected by user 102, the e-commerce payment facilitator 106 can interact with payment aggregator system 108 in order to process the financial transaction using the payment aggregator network 114. The payment aggregator network 114 can include a payment aggregator system 108, a payment service provider system 110, and a banking system 112. In other embodiments, however, the payment aggregator network 114 includes more or fewer actors, though in most embodiments the payment aggregator network 114 includes at least a payment aggregator system 108. As explained in greater detail below, each component 104-114 of the system 100 can execute on and/or be implemented by one or more computing devices.

The embodiment illustrated in FIG. 1 includes a user 102 accessing a commerce application 104. As explained in greater detail below, the commerce application 104 can comprise a network application, such as a web application or a native application. Further, in one or more other embodiments the commerce application 104 can comprise a desktop and/or mobile web application. Moreover, the commerce application 104 can execute on a client device and/or one or more servers. Furthermore, the commerce application 104 can offer the sale of goods and/or services to the user 102. The user 102 may begin an order by selecting one or more items or services offered through the commerce application 104. To begin the checkout process and select a payment method for the order, the user 102 may indicate to the commerce application 104 that they would like to checkout (e.g., selecting a checkout button or other option).

The e-commerce payment facilitator 106 can establish relationships with multiple payment aggregator systems similar to payment aggregator system 108. The e-commerce payment facilitator 106 can also store numerous payment methods, including those supported by payment aggregator system 108 and other payment aggregator systems. The e-commerce payment facilitator 106 can provide these payment methods to commerce application 104 to improve the checkout experience of user 102. In at least one embodiment, prior to providing payment methods to commerce application 104, e-commerce payment facilitator 106 identifies a payment aggregator system 108 to process each payment method in the event the user 102 selects that payment method. In an alternative embodiment, numerous payment methods are provided to commerce application 108 and, following the user's 102 selection of a particular payment method, e-commerce payment facilitator 106 determines a payment aggregator system 108 to process the selected payment method.

The e-commerce payment facilitator 106 can store routing information in order to determine that the user's 102 financial transaction should be processed by a payment aggregator system 108. More specifically, the e-commerce payment facilitator 106 can distribute transactions for each payment method across each payment aggregator system with which the e-commerce payment facilitator 106 has a relationship. In at least one embodiment, e-commerce payment facilitator 106 assigns a percentage of transactions for each payment method to each payment aggregator system 108 that the e-commerce payment facilitator 106 uses. The e-commerce payment facilitator 106 then routes financial transactions to payment aggregator systems according to these percentages.

The e-commerce payment facilitator 106 can also receive transaction processing information, such as transaction processing parameters (e.g., transaction fee values, transaction price point values, etc.), from a payment aggregator system 108. In particular, a payment aggregator system 108 can provide e-commerce payment facilitator 106 with an indication of the transaction fees charged by payment aggregator system 108 for each payment method that payment aggregator system 108 supports. Transaction fees may be a percentage of the total cost of the goods or services being purchased (e.g., 3%) or a fixed cost per transaction (e.g., $1.50 USD).

A payment aggregator system 108 can also provide e-commerce payment facilitator 106 with an indication of price points for each payment method that payment aggregator system 108 supports. Price points are fixed amounts with which transactions using certain payment methods should comply. For example, a particular payment method may require all transactions to be at price points of even numbered dollar values (i.e., $2, $4, $6, etc.). In the event a transaction is between two price points of a payment method (e.g., $3, as applied to the foregoing example), e-commerce payment facilitator 106 or payment aggregator system 108 may perform "price jumping" by charging the user 102 the higher price point and capturing the difference as a fee (e.g., charge the user 102 $4 and capture a $1 fee, as applied to the foregoing example). Receiving transaction processing information from payment aggregator systems allows e-commerce payment facilitator 106 to use this information in routing transactions, thereby enabling e-commerce payment facilitator 106 to optimize the profitability of using payment aggregator systems to process transactions.

The e-commerce payment facilitator 106 can store profile information associated with the user 102, and use this information to route the user's 102 transaction using a selected payment method to a payment aggregator system 108. More specifically, e-commerce payment facilitator 106 can store the user's 102 first name, middle name, last name, payment method number (e.g., credit/debit card number, mobile phone number, prepaid stored value card/voucher number, etc.), expiration date (e.g., year and/or month) of the payment method number, a billing address (e.g., including street name, house number, city, state or province, zip code, country, etc.) associated with the payment method number, a phone number associated with the payment method number, and one or more shipping addresses (e.g., including fields similar to the billing address). The e-commerce payment facilitator 106 can also store the user's 102 unique user identifier (e.g., user ID number, username, etc.) and preferred currency. Additionally, the e-commerce payment facilitator 106 can detect and store the geographic location of the user or the user's computing device. Accordingly, the e-commerce payment facilitator 106 can use this information to determine a payment aggregator system 108 to process a financial transaction that uses a payment method selected by the user 102.

The e-commerce payment facilitator 106 can also store information relating to completed transactions. More specifically, the e-commerce payment facilitator 106 can store information relating to the user's 102 prior transactions, including indications of the commerce applications used, items purchased, each item's cost, transaction fees, transaction totals, payment methods used, and payment aggregator systems used. The e-commerce payment facilitator 106 can use this information to provide an improved checkout experience to the user 102. For example, the e-commerce payment facilitator 106 may reference completed transaction information to ensure that the user 102 is always routed to a particular payment aggregator system 108 for a particular payment method, thereby providing a more consistent checkout experience that helps avoid abandoned transactions.

In one or more embodiments, the e-commerce payment facilitator 106 can also store information relating to prior transactions processed through payment aggregator system 108. In particular, e-commerce payment facilitator can calculate and store transaction metrics that relate to payment aggregator system 108 (e.g., transaction fees, transaction conversion rate, reliability score, availability score, profitability score, etc.) based on prior complete or incomplete transactions. As an example, e-commerce payment facilitator 106 can then use these transaction metrics in determining which payment aggregator system a user is routed to for a particular payment method. As one can appreciate from the disclosure herein, this allows e-commerce payment facilitator 106 to achieve the advantage and benefit of increasing profitability by selecting payment aggregator systems based on transaction fees and other metrics. In addition, e-commerce payment facilitator 106 can exert greater control over the routing of transactions to payment aggregator systems by considering transaction fees and/or other metrics.

Once the user 102 indicates to the commerce application 104 that they would like to checkout, the commerce application 104 can provide the e-commerce payment facilitator 106 with cart information, including an indication of the items to be purchased, each item's price, and the currency for each item price. After receiving the cart information, the e-commerce payment facilitator 106 can allow the user 102 to select a payment method for the transaction. Upon the user's 102 selection of a payment method for the transaction, the e-commerce payment facilitator 106 enables the user 102 to complete the transaction by providing payment method information to a payment aggregator system 108. In at least one embodiment, the user 102 provides the payment method information directly to a payment aggregator system 108. Alternatively, in another embodiment, the user 102 provides payment method information to the e-commerce payment facilitator 106, which acts as an intermediary and in turn provides the transaction, including the payment method information, to a payment aggregator system 108 (typically over a communication network).

Once the transaction is received from the e-commerce payment facilitator 106, the payment aggregator system 108 then passes the transaction to a payment service provider system 110. Examples of payment service provider systems include the payment processing services provided by PayPal, Inc., Skrill Ltd., paysafecard.com Wertkarten AG, Trustly Group AB, DaoPay GmbH, and Smart Voucher Ltd., among others. The payment service provider system 110 either approves or declines the transaction, and sends the decision back to the payment aggregator system 108. If the transaction is approved, the payment service provider system 110 can send the transaction to an appropriate banking system 112. The payment aggregator system 108, in one or more embodiments, stores details concerning the transaction and the decision received from the payment service provider system 110, and then passes information about the transaction, including the decision, back to the e-commerce payment facilitator 106 and/or the commerce application 104.

One will appreciate in light of the disclosure herein that the e-commerce payment facilitator 106 can provide numerous benefits to both the user 102 and the commerce application 104. For example, the e-commerce payment facilitator 106 can improve the number of available payment methods and reduce the amount of abandoned transactions by providing a user with additional payment methods offered through multiple payment aggregators. In addition, the e-commerce payment facilitator 106 can consider a range of transaction fees offered by multiple payment aggregators. This allows an e-commerce payment facilitator 106 to improve the profitability of processing transactions through a payment aggregator system 108.

Additionally, the e-commerce payment facilitator 106 can provide greater control over the processing of transactions by allowing for the routing and distribution of transactions across multiple payment aggregator systems. This can greatly improve the reliability and availability of processing transactions for particular payment methods. This allows an e-commerce payment facilitator 106 to provide improved services to the user 102 and the commerce application 104.

Figure 2:
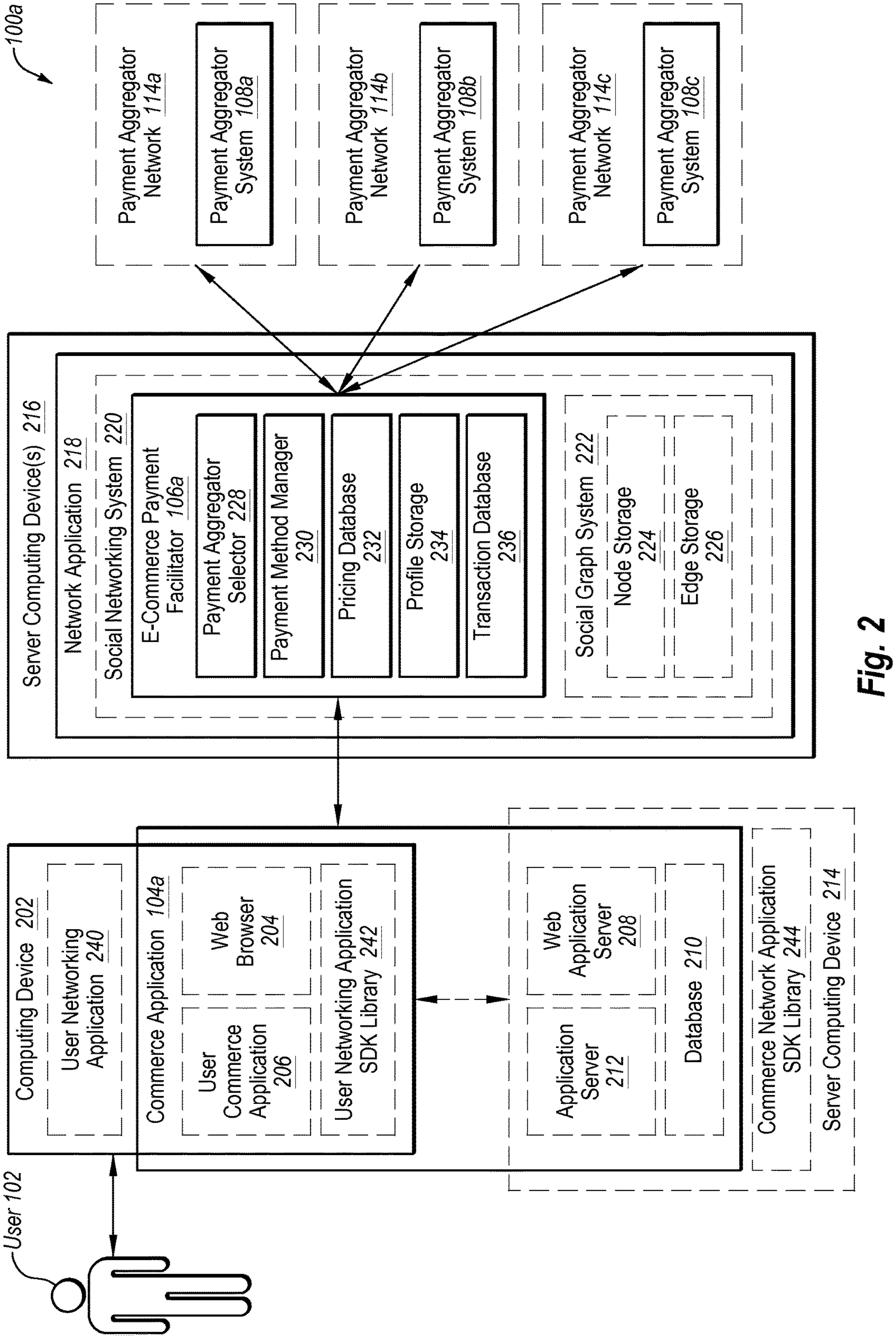
FIG. 2 illustrates a detailed schematic diagram of a commerce application, network application, and multiple payment aggregator systems of the system of FIG. 1 in accordance with one or more embodiments.

FIG. 2 illustrates a schematic diagram illustrating a system 100*a* in accordance with an embodiment. System 100*a* illustrates one example embodiment of system 100. In particular, FIG. 2 illustrates one embodiment of a commerce application 104*a*, an e-commerce payment facilitator 106*a*, and multiple payment aggregator systems 108*a*-108*c*. As shown by FIG. 2, the user 102 can use a computing device 202 to access a commerce application 104*a*. In embodiments where the commerce application 104*a* is a web application, the user 102 may interface with the commerce application 104*a* using a web browser 204 application or a user commerce application 206 (also referred to as a special-purpose client application later herein), and thus these applications may or may not be considered as part of the commerce application 104*a*.

In such embodiments where the commerce application 104*a* is a web application, the backend of the commerce application 104*a* (i.e., the set of applications providing data and logic for the commerce application 104*a*) may include a web application server 208 (including but not limited to the Apache HTTP Server by the Apache Software Foundation, Internet Information Services (IIS) by Microsoft Corporation, nginx by Nginx, Inc., the open-source lighttpd web server, Google Web Server (GWS) by Google Inc., and Amazon Web Services (AWS) by Amazon.com, Inc.) and optionally a relational or non-relational database 210 (including but not limited to MySQL by Oracle Corporation, PostgreSQL by the PostgreSQL Global Development Group, Apache Cassandra by the Apache Software Foundation, HBase by the Apache Software Foundation, and MongoDB by 10 gen).

In embodiments where the commerce application 104*a* is a native application, the user 102 uses the user commerce application 206, which may use an application server 212 (e.g., a Java application server) and/or database 210 of a separate server computing device 214 and thus be deemed a network application, or may not use the application server 212 or database 210 and thus be deemed a standalone application. Accordingly, depending upon the context of the term "commerce application," this term may refer to software executing on the user's computing device 202 and/or the server computing device 214. In particular, at least a first portion of the commerce application software can execute on the user's computing device 202 and at least a second portion of the commerce application software can execute on the set of one or more server computing devices 214. Further, in one or more embodiments, the commerce application 104*a* can be an application separate from the e-commerce payment facilitator 106*a* and/or network application 218 described in further detail below. Alternatively, in one or more embodiments, the commerce application 104*a* can be provided as functionality within the e-commerce payment facilitator 106*a* and/or network application 218 described in further detail below.

The commerce application 104*a* can interact with an e-commerce payment facilitator 106*a* to provide users, such as user 102, with numerous payment methods. Additionally, the e-commerce payment facilitator 106*a* can interact with one of payment aggregator systems 108*a*-108*c* of payment aggregator networks 114*a*-114*c* in order to route and process transactions as described hereinabove in relation to FIG. 1. Examples of payment aggregator systems include online payment aggregator systems (such as the payment aggregator services provided by Adyen B. V., Playspan, Inc., Live Gamer Inc., etc.) and mobile payment aggregator systems (such as the payment aggregator services provided by Boku, Inc., and Zong, Inc.). The depicted embodiments illustrate three payment aggregator systems 108*a*-108*c* and three payment aggregator networks 114*a*-114*c*. One will appreciate in light of the disclosure herein that in alternative embodiments the e-commerce payment facilitator 106*a* can interface with any number of different payment aggregator systems and payment aggregator networks to process payments and financial transactions. For example, the e-commerce payment facilitator 106*a* can interface with a first payment aggregator system 108*a* for a first payment method, interface with a second payment aggregator system 108*b* for second payment method, and interface with a third payment aggregator system 108*c* for a third payment method.

As one can appreciate from the disclosure herein, by interacting with one or more payment aggregator systems, e-commerce payment facilitator 106*a* can increase the number of available payment methods and reduce the amount of transactions abandoned by users. Additionally, this benefit can be achieved while allowing the commerce application 104*a* to process the transaction using its existing relationships with the e-commerce payment facilitator 106*a*.

The system 100*a* of the embodiment illustrated in FIG. 2 includes a set of one or more server computing devices 216 that provide a network application 218 including an e-commerce payment facilitator 106*a*. In one or more embodiments, the network application 218 comprises a social networking system 220 (such as but not limited to FACEBOOK™), but in other embodiments the network application 218 may comprise another type of application, including but not limited to an e-mail application, search engine application, e-commerce application, banking application, or any number of other application types that use user accounts. In one or more embodiments where the network application 218 comprises a social networking system 220, the network application 218 may include a social graph system 222 for representing and analyzing a plurality of users and concepts. A node storage 224 of the social graph system 222 can store node information comprising nodes for users, nodes for concepts, and nodes for items. An edge storage 226 of the social graph system 222 can store edge information comprising relationships between nodes and/or actions occurring within the social networking system 220. Further detail regarding social networking systems, social graphs, edges, and nodes is presented below with respect to FIG. 11.

The e-commerce payment facilitator 106*a* of the network application 218 can comprise a payment aggregator selector 228 that provides logic for identifying a payment aggregator system, such as payment aggregator system 108*a*, to process a transaction using a particular payment method. For example, for each payment method that the e-commerce payment facilitator 106*a* provides to the user 102, the payment aggregator selector 228 can determine a corresponding payment aggregator system, such as payment aggregator system 108*a*, to process the transaction. Alternatively, once the user's 102 selection of a payment method is received by the e-commerce payment facilitator 106*a*, payment aggregator selector 228 can identify one of payment aggregator systems 108*a*-108*c* to process the transaction.

Once payment aggregator selector 228 selects a payment aggregator system, the e-commerce payment facilitator 106*a* can then forward the user 102 and/or the commerce application 104*a* to payment aggregator system 108*a* to complete payment for the transaction. Moreover, in at least one embodiment, the payment aggregator selector 228 uses information stored in pricing database 232, described in further detail below, to identify a payment aggregator system to process the transaction. In another embodiment, the payment aggregator selector 228 uses information stored in profile storage 234, described in further detail below, to identify the payment aggregator system for the transaction. In yet another embodiment, the payment aggregator selector 228 uses information stored in transaction database 236, described in further detail below to identify the payment aggregator system for the transaction.

Furthermore, in one or more embodiments the payment aggregator selector 228 can perform several checks before selecting a payment aggregator system for a particular payment method. For example, payment aggregator selector 228 can determine whether a payment aggregator system is available to process the transaction. More specifically, payment aggregator selector 228 may check whether a payment aggregator system has reported an inability to process transactions (e.g., a reported outage or downtime due to regularly scheduled maintenance) to the e-commerce payment facilitator 106*a*. Additionally, payment aggregator selector 228 may check whether a payment aggregator system is reachable (e.g., via a ping over a communications network). As another example, payment aggregator selector 228 can determine the availability of a payment aggregator system by checking a pricing database 232 for transaction processing information, such as transaction processing parameters (e.g., transaction fees, price points, etc.). In the event a primary payment aggregator system is determined to not be available, then payment aggregator selector 228 can identify a secondary payment aggregator system that is available to process the transaction.

Accordingly, as one can appreciate from the disclosure herein, one or more embodiments assist e-commerce payment facilitator 106*a* in dealing with the unavailability of payment aggregators by providing backup payment aggregators. In particular, the one or more embodiments improve the reliability of processing transactions by providing redundant payment aggregator systems that can be used as failovers. Accordingly, the one or more embodiments can reduce the possibility of abandoned transactions resulting from system downtime.

In the depicted embodiment, the e-commerce payment facilitator 106*a* also includes a payment method manager 230. Upon receiving an indication from the user 102 that they would like to checkout, the payment method manager 230 can determine which payment methods, from a plurality of payment methods, can be provided to the user 102 for use in completing the transaction. Examples of payment methods include traditional payment methods, such as credit/debit cards (e.g., VISA™, MASTERCARD™, etc.), and alternative payment methods, such as virtual wallets (e.g., PAYPAL™, GOOGLE WALLET™, SKRILL™, etc.), mobile phone carrier-billing services (e.g., payments through mobile phone service providers such as VERIZON™, AT&T™, etc.), and prepaid stored value cards/vouchers (e.g., PAYSAFECARD™, UKASH™, etc.).

In one or more embodiments, the payment method manager 230 uses information stored in pricing database 232, described in further detail below, to determine the payment methods to provide to the user 102. For example, the payment method manager 230 can identify payment methods based on whether the price points for those payment methods are compatible with the transaction amount. In another embodiment, the payment method manager 230 uses information stored in profile storage 234, as described in further detail below, to determine the payment methods available for the user's 102 transaction. For example, the payment method manager 230 can identify payment methods to present to the user 102 based on prior payment methods used by the user 102. Furthermore, in one or more embodiments, the payment method manager 230 can determine which payment methods to present to the user 102 by detecting the geographic location of the computing device 202 used by the user 102 to initiate the transaction.

FIG. 2 also illustrates that, in one or more embodiments, the e-commerce payment facilitator 106*a* can include a pricing database 232 that stores transaction processing information, such as transaction processing parameters (e.g., transaction fees and/or price points), received from one or more payment aggregator systems. For example, the e-commerce payment facilitator 106*a* can receive transaction processing information from each payment aggregator system 108*a*-108*c* and this transaction processing information can be stored in pricing database 232. In one embodiment, once transaction processing information is received and stored in pricing database 232, payment aggregator selector 228 can use this transaction processing information to identify a payment aggregator system to process a particular transaction that uses a particular payment method. For example, the payment aggregator system with the lowest transaction fees can be selected. Further, in one embodiment, payment method manager 230 can use the pricing information in pricing database 232 to determine which payment methods to provide to a user. For instance, the payment methods with the lowest transaction fees can be selected.

As FIG. 2 shows, in one or more embodiments the e-commerce payment facilitator 106*a* can include a profile storage 234 that provides storage for information regarding users of the network application 218. For example, the user 102 can create an account with the network application 218. In creating an account, the user 102 can be assigned a unique user identifier, such as a user ID number, which will be stored in the profile storage 234. The network application can also allow the user 102 to provide a preferred currency and/or a preferred country to be stored in the profile storage 234.

Additionally, network application 218 can allow the user 102 to provide payment information for one or more payment methods. The network application 218 can then save that payment information in the profile storage 234. In one or more embodiments the profile storage 234 can store in relation to the user 102 one or more of: a first name, a middle name, a last name, a payment method number (e.g., a credit/debit card, mobile phone number, prepaid stored value card/voucher number, etc.), an expiration date (year and/or month) of the payment method number, a security code of the payment method number (e.g., a Card Verification Value (CVV or CVV2), etc.), a Personal Identification Number (PIN) of the payment method number, a billing address (e.g., including street name, house number, city, state or province, zip code, country, etc.) associated with the payment method number, a phone number associated with the payment method number, and one or more shipping addresses (e.g., including similar fields as the billing address). In an embodiment where the network application 218 comprises a social networking system 220, at least one of the unique user identifier, preferred currency, and payment information stored in the profile storage 234 may be associated with a node of the node storage module 224 that represents the user 102.

In one or more embodiments, the profile storage 234 is further configured to receive and/or store, for the user 102, a user payment aggregator identifier that indicates which payment aggregator system is preferred to process transactions for the user 102. The profile storage 234 can also include a merchant payment aggregator identifier that indicates which payment aggregator system is preferred by the commerce application 104*a* or the merchant operating the commerce application 104*a*. Accordingly, the e-commerce payment facilitator 106*a* can further determine the payment aggregator system for a particular transaction based on a consideration of one or both of the user payment aggregator identifier and the merchant payment aggregator identifier. Moreover, the profile storage 234 may also include an application identifier (or merchant identifier, or account identifier) to be used when interacting with the identified payment aggregator system to identify which account is to be credited with the funds from the user 102. In some embodiments, the payment aggregator selector 228 identifies the payment aggregator system based either in part or exclusively upon information from within the received transaction request itself.

Further, the profile storage 234 can store profile information associated with the payment aggregator systems 108*a*-108*c*. For example, the profile storage 234 can store indications of the payment methods supported by each payment aggregator system 108*a*-108*c*. Additionally, the profile storage 234 can store profile information associated with one or more countries or other geographic locations. As an example, the profile storage 234 can store indications of the payment methods available in each country or geographic location. Accordingly, in one or more embodiments, the e-commerce payment facilitator 106*a* can use the profile storage 234 to access information useful in determining the payment methods available for a transaction and the respective payment aggregator systems to process the available payment methods.

As depicted in FIG. 2, in one or more embodiments the e-commerce payment facilitator 106*a* can include a transaction database 236. The transaction database 236 can store details of transactions started and/or completed for each user and/or each commerce application. Thus, the transaction database 236 can allow a user to retrieve details on all purchases made with help from the e-commerce payment facilitator 106*a*. One will appreciate that this can allow a user to login to the network application 218 and retrieve transaction details regarding purchases made on any number of different commerce applications and/or through any number of different payment aggregator systems using any number of different payment methods. This provides a significant advantage, as users who do not use the e-commerce payment facilitator 106*a* may need to remember usernames and passwords and login into several commerce applications to get the information and details that the transaction database 236 can provide.

The transaction database 236 can provide for each transaction, attempted or completed, a date, an indication of the commerce application where the transaction was completed, an amount of the transaction, the items/services purchased as part of the transaction (optionally a URL of the open graph product), a status of the transactions (completed, shipped, in progress, returned, denied, etc.), a transaction ID that allows the users to provide to the commerce application to reference the transaction, or other details.

The transaction database 236 can allow users or merchants operating a commerce application to retrieve details regarding transactions, such as a history of transactions including one or more of the transaction details described above. When the network application 218 comprises a social networking system, the transaction database 236 can provide additional demographic information about the user who purchased items from the commerce application 104*a* (geographic location of users, age of user, gender of users, etc.) pulled from the social graph system 222.

The embodiment of FIG. 2 also includes a user networking application 240. In an embodiment where the network application 218 comprises a social networking system 220, the user networking application 240 allows the user 102 to use the social networking system 220. The user networking application 240 can comprise a native social networking application that runs on a client device. For example, in one or more embodiments the user networking application 240 can comprise a FACEBOOK™ native application. In alternative embodiments, the user networking application 240 might not strictly be for social networking purposes. The user networking application 240 can represent any native application executing on the computing device 202 that allows the user 102 to interact with the network application 218. In one or more embodiments, the user 102 uses the user networking application 240 to log in to a social networking system 220, causing the computing device 202 to store an obfuscated user identifier in a portion of shared memory of the computing device 202. This obfuscated user identifier can later be used by the commerce application 104*a* to provide the identity of the user 102 to network application 218.

The depicted embodiment also includes a user networking application SDK library 242. The user networking application SDK library 242 provides a set of routines for the user commerce application 104*a* to use to interact with the network application 218. In an embodiment, all interaction between the commerce application 104*a* and the e-commerce payment facilitator 106*a* flows through the user networking application SDK library 242. In one or more embodiments where at least some of the commerce application 104*a* executes on a server computing device 214, the server computing device 214 may include a commerce network application SDK library 244 that serves the same purpose, or works in conjunction with, the user networking application SDK library 242.

As one can appreciate from the disclosure herein, FIG. 2 illustrates that one or more embodiments provide the advantages and benefits of an increased number of payment methods provided by using multiple payment aggregator systems to process transactions. Additionally, FIG. 2 shows that one or more embodiments can provide improved reliability and availability of processing transactions through primary payment aggregator systems, if possible, or secondary backup payment aggregator systems, if necessary. Further, FIG. 2 depicts one or more embodiments that allow e-commerce payment facilitator 106*a* greater control over the routing and distribution of transactions payment aggregator systems. Thus, these advantages and benefits enable e-commerce payment facilitator 106*a* to provide a better service to commerce applications and their users.

Figure 3A:
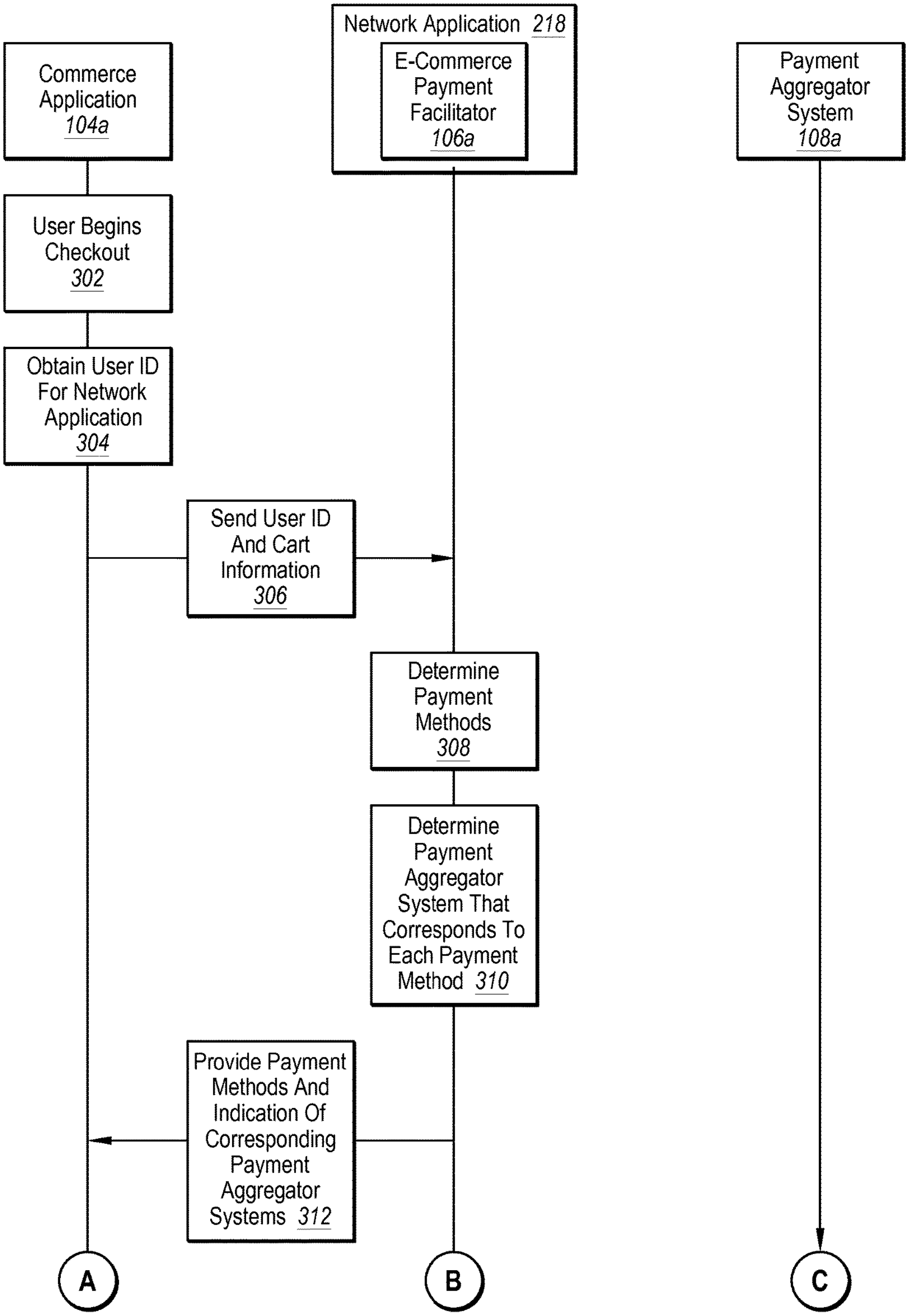
FIGS. 3A-3B illustrate a sequence-flow diagram of interactions between the commerce application, network application, and a payment aggregator system of FIG. 2 in accordance with one or more embodiments.
Figure 3B:
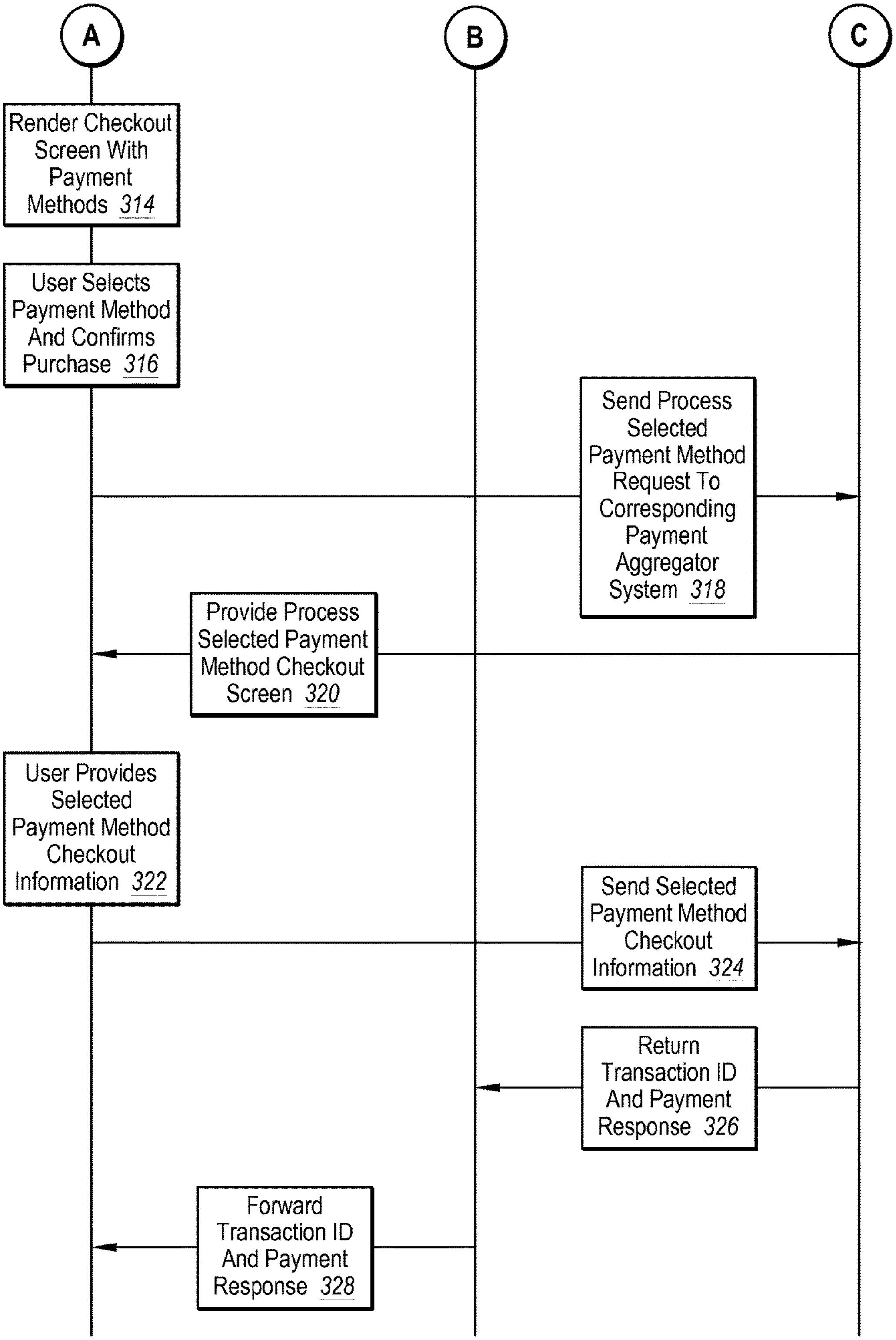

Referring now to FIGS. 3A-3B, which show a sequence-flow diagram illustrating an embodiment of an e-commerce payment facilitator 106*a* providing indications of payment methods and corresponding payment aggregator systems to a commerce application 104*a*. The diagram of FIGS. 3A-3B illustrate a timeline of interactions between the commerce application 104*a*, the network application 218/e-commerce payment facilitator 106*a*, and the payment aggregator system 108*a*, in accordance with an embodiment of the present invention.

Prior to any processing of transactions, the commerce application 104*a* can set up an account with a network application 218, and the network application 218 can establish relationships and/or accounts with one or more payment aggregator systems, such as payment aggregator system 108*a*. In alternative embodiments, the commerce application's 104*a* account with the network application 218, and the network application's 218 relationships and/or accounts with payment aggregator systems can be preexisting.

Figure 5A:
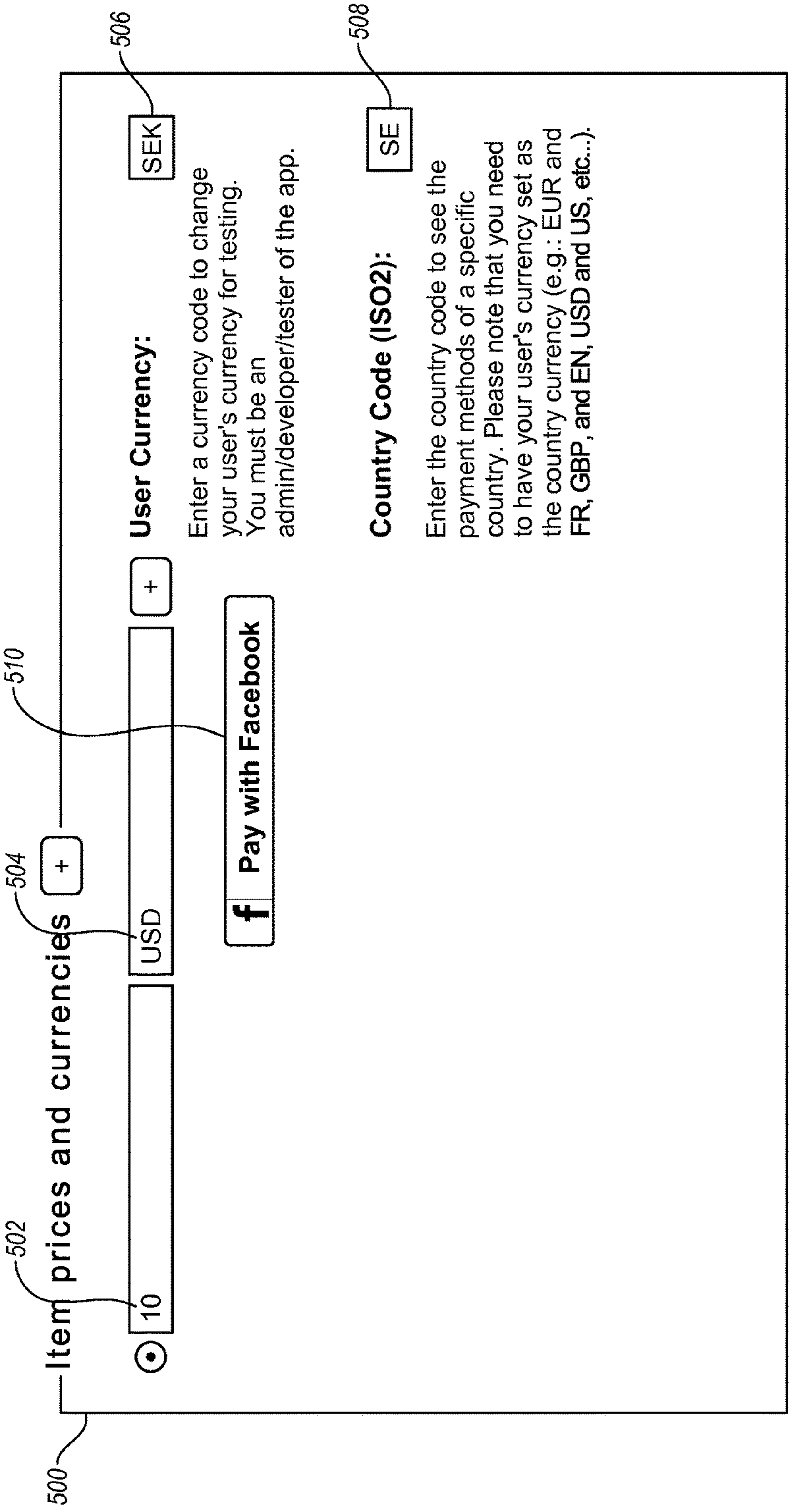
FIGS. 5A-5C illustrate user interfaces for performing a first alternative payment transaction using a first payment aggregator system in accordance with one or more embodiments.

As shown by 302, the user can begin a checkout process using the commerce application 104*a*. In particular, the user can place one or more items or services offered by the commerce application 104*a* into a virtual cart. In one or more embodiments, the user can indicate to the commerce application 104*a* that they would like to checkout (e.g., selecting a checkout button or other option). For example, the commerce application 104*a* can provide a checkout option including a glyph (i.e., a mark, an icon, a graphic, a portion of text, etc.) indicating that the user may use the network application 218/e-commerce payment facilitator 106*a* to complete the purchase of the items in the virtual cart of the commerce application 104*a*. The checkout option can comprise a button presented in the checkout user interface of the commerce application 104*a*, a selectable overlay that appears over the checkout user interface of the commerce application 104*a*, a plug-in, a pop-up, or other selectable option. For example, in one or more embodiments such as when the commerce application 104*a* comprises a web application, an iframe may be added to the code defining the web page. Additionally or alternatively, the commerce application 104*a* can call an SDK function that renders the selectable option. One example of the checkout option is illustrated in FIG. 5A as element 510.

One will appreciate in light of the disclosure herein that the use of an SDK function or an iframe are two examples of ways to render or call the checkout option. Embodiments, however, are not limited to the use of an SDK function or an iframe. For example, in alternative commerce application embodiments, instead of using an iframe, the network application 218/e-commerce payment facilitator 106*a* can pass checkout process information to the commerce application 104*a* and the commerce application 104*a* can then render the checkout process to the user.

At this point, or before, the commerce application 104*a* can obtain, identify, or otherwise discover a user identifier 304 for the user for the network application 218. For example, the commerce application 104*a* can access an obfuscated (e.g., hashed, encrypted, or otherwise algorithmically transformed) user identifier of the user existing on the computing device 202 of the user. This user identifier can identify a user profile/account for that user of the network application 218 (e.g., a social networking application). In one or more embodiments, the user identifier is accessed from a portion of shared memory accessed by or reserved by the network application 218, and may only exist if the user is currently "logged on" to the network application 218. In one or more other embodiments, the user identifier is accessed from a cookie (e.g., HyperText Transfer Protocol (HTTP) cookie) or from application cache (e.g., a HyperText Markup Language version 5 (HTML5) application cache) on the user's computing device 202.

This process may serve as the authentication for the user, as the existence of a properly obfuscated user identifier for the network application 218 on the user's computing device 202 indicates that the user has already been authenticated by the network application 218, and thus the commerce application 104*a* may rely upon this authentication. Additionally, at this point of the checkout process, there is no security or privacy leak of the user's details to the commerce application 104*a*, which only has the obfuscated user identifier.

In addition to the foregoing, the e-commerce payment facilitator 106*a* or the network application 218 can provide the commerce application 104*a* an app access token or pre-agreed secret code. The app access token or pre-agreed secret code can allow the commerce application 104*a* to prove its identity and authenticity to the e-commerce payment facilitator 106*a* and/or the network application 218 when making API calls. In one or more embodiments, the e-commerce payment facilitator 106*a* or the network application 218 provides the app access token or pre-agreed secret via a server-to-server call.

Upon the user beginning the checkout process 302 and the commerce application 104*a* obtaining the user ID 304, the commerce application 104*a* can send to the e-commerce payment facilitator 106*a* the user ID and the cart information 306. In one or more embodiments the commerce application 104*a* can send the user ID and the cart information 310 prior to rendering a checkout screen and/or providing any payment methods to the user. In one or more embodiments, the cart information can comprise a total price of the goods or services in the virtual cart of the commerce application 104*a*.

In response to receiving the user ID from the commerce application 104*a*, the network application 218/e-commerce payment facilitator 106*a* can use the user ID to identify payment information of the user 102 stored by the profile storage 234 and/or to identify a user node stored by the node storage 220 for the user. When the user ID comprises an obfuscated user identifier, the network application 218/e-commerce payment facilitator 106*a* can transform the user ID into a non-obfuscated user identifier using a transformation function, which includes but is not limited to the application of a hash function to the obfuscated user identifier, a symmetric key cryptographic function to the obfuscated user identifier, the application of a public-key (asymmetric key) cryptographic function to the obfuscated user identifier, or the comparison of the obfuscated user identifier to a list of obfuscated user identifiers mapped to non-obfuscated user identifiers.

In one or more embodiments, the cart information can comprise detailed information about the items in the cart. For example, the cart information can comprise a JSON encoded array of cart items. Each JSON object in the array can comprise one or more of a name of the item, an amount of the item, the quantity of the item, and a URL of the item that the user desires to purchase. In still further embodiments, the cart information can comprise product names, product numbers (e.g., stock keeping units (SKUs), serial numbers, model numbers, Universal Product Codes (UPCs), etc.), product prices, product quantities, order dates, invoice numbers, and applicable taxes. In one embodiment, the detailed information about the items in the cart is provided at step 306. Additionally or alternatively, the detailed information about the items in the cart is provided to the e-commerce payment facilitator 106*a* some time after step 306.

Upon receiving the user ID and the cart information from the commerce application 104*a* in step 306, the e-commerce payment facilitator 106*a* determines payment methods 308 that are available for the transaction. In one embodiment, the available payment methods are determined by the geographic location of the user or the user's computing device. The geographic location may be identified based on at least one of the following: a locale/country of origin field stored in the user's profile, a location field entered by the user and stored in the user's profile, the IP address of the user's last login to network application 218 or e-commerce payment facilitator 106*a*, the IP address of the user's computing device 202, or Global Positioning System (GPS) coordinates associated with the user's computing device 202. Once the user's geographic location is determined, the e-commerce payment facilitator 106*a* can identify the payment methods available in that geographic location. For example, the e-commerce payment facilitator 106*a* can use the payment method manager 230 to lookup the payment methods of the user's current country by referencing a mapping of countries to available payment methods stored in a table, database, or other suitable data structure. In another embodiment, the available payment methods can be determined based on the user's preferred currency (i.e., payment methods available for the country associated with the user's preferred currency), saved payment methods stored in the user's profile, or payment methods used by the user previously (e.g., payment methods used by the user and stored in the transaction database 236).

As FIG. 3A illustrates, the e-commerce payment facilitator 106*a* then determines a payment aggregator system that corresponds to each payment method 310. In one embodiment, the e-commerce payment facilitator 106*a* uses a transaction routing table, described in further detail below with respect to FIGS. 4A-4B, to identify a payment aggregator system that corresponds to each payment method. For example, for every payment method, the e-commerce payment facilitator 106*a* assigns a percentage range of user IDs (also referred to herein as a transaction routing range) to each payment aggregator system capable of processing each respective payment method (e.g., for a first available payment method, the initial 30% of user IDs are assigned to a first payment aggregator system, the next 33% of user IDs are assigned to a second payment aggregator system, and the last 34% of user IDs are assigned to a third payment aggregator system, whereas for a second available payment method, the first 50% of user IDs are assigned to the first payment aggregator system and the second 50% of user IDs are assigned to the second payment aggregator system, with no percentage of user IDs being assigned to the third payment aggregator system).

In one or more embodiments, to determine which percentage range (i.e., a transaction routing range) a particular user ID falls into, the e-commerce payment facilitator 106*a* can determine a transaction routing value for the user ID. For example, the e-commerce payment facilitator 106*a* can perform a hash function on a user ID number u associated with the user executing the transaction to yield a hashed user ID number h. For example, the hash function (u modulo 100)+1=h can hash any user ID number u into a hashed user ID number h within the numerical range of 1 to 100. Once the hashed user ID number h has been computed, the e-commerce payment facilitator 106*a* can determine which payment aggregator system to use to process each available payment method in the event the payment method is selected by the user. For example, for each available payment method identified in step 308, the e-commerce payment facilitator 106*a* can determine which percentage range the hashed user ID h falls into for each payment aggregator system. Then the e-commerce payment facilitator 106*a* can assign a particular payment aggregator system to process each particular payment method based on the hashed user ID h being in the percentage range associated with the particular payment aggregator system for each particular payment method.

Alternatively, in one or more embodiments the e-commerce payment facilitator 106*a* can determine a payment aggregator system that corresponds to each payment method 310 using a variety of other methods. In one embodiment, the e-commerce payment facilitator 106*a* can use transaction fees of payment aggregator systems to determine a payment aggregator system that corresponds to each payment method. For example, for each available payment method identified in step 308, the e-commerce payment facilitator 106*a* may select the payment aggregator system with the lowest transaction fees. In another embodiment, the e-commerce payment facilitator 106*a* can use round robin scheduling to equally distribute transactions across all available payment aggregator systems. For example, the e-commerce payment facilitator 106*a* may use round robin scheduling to assign a first payment aggregator to process a first transaction using a first available payment method and a second payment aggregator to process a second transaction using the first available payment method. Still further, the e-commerce payment facilitator 106*a* can determine a payment aggregator system that corresponds to each payment method based on the reliability, profitability, or transaction completion/conversion rate of the available payment aggregator systems (e.g., by referencing or computing this information from data stored by the e-commerce payment facilitator 106*a* in various components, such as pricing database 232, profile storage 234, or transaction database 236).

Following the determination of a payment aggregator system that corresponds to each payment method 310, the e-commerce payment facilitator 106*a* provides the available payment methods and an indication of the corresponding payment aggregator systems 312 to commerce application 104*a*. The available payment methods and an indication of the corresponding payment aggregator systems can be provided to commerce application 104*a* in a data format such as JSON or XML. In one embodiment, the commerce application 104*a* can be provided with a name and logo of each available payment method. The commerce application 104*a* can also be provided with a unique identifier of each available payment method. In one or more embodiments, the indication of corresponding payment aggregator systems can be a uniform resource locator (URL). For example, the commerce application 104*a* can be provided with a uniform resource locator (URL) for each available payment method, where that URL identifies the corresponding payment aggregator system's processing page and/or iframe for the particular available payment method.

As FIG. 3B shows, in one or more embodiments, upon receiving the available payment methods and an indication of corresponding payment aggregator systems 312 from e-commerce payment facilitator 106*a*, the commerce application 104*a* can render a checkout screen with the available payment methods 314. For example, the commerce application 104*a* can display all of the available payment methods as selectable options visible to the user. One will appreciate from the disclosure herein that the commerce application 104*a* itself can render the checkout screen, or the commerce application 104*a* can allow the e-commerce payment facilitator 106*a* to render the checkout screen as an overlay to the commerce application 104*a*. In particular, in one or more embodiments a checkout screen (e.g., pay dialog) can be provided as an overlay in the form of a popup user interface, screen, or dialog that overlaps and/or is on top of the user interface of the commerce application 104*a*.

The user of the commerce application 104*a* then selects a payment method and confirms the transaction 316. For example, when the e-commerce payment facilitator 106*a* provides the commerce application 104*a* with the available payment methods, the user can select one of the available payment methods and then select a "Buy" or "Order" button or other selectable option to complete the transaction. In alternative embodiments, the user may be required to complete one or more fields relating to the selected payment method prior to proceeding to complete the transaction.

In response to the user selecting a payment method and confirming the transaction 316, the commerce application 104*a* sends a process selected payment method request 318 to the corresponding payment aggregator system 108*a*. In particular, the commerce application 104*a* can make a call to the payment aggregator system 108*a* to invoke the process selected payment method checkout screen that payment aggregator system 108*a* provides for the selected payment method. For example, the commerce application 104*a* can invoke an iframe provided by the payment aggregator system 108*a* for the processing of the selected payment method. In an alternative embodiment, the commerce application can make a call to the e-commerce payment facilitator 106*a* to process the selected payment method, which can in turn either forward that request onto the payment aggregator system 108*a* or invoke the payment aggregator system's 108*a* process selected payment method checkout screen on behalf of the commerce application 104*a*.

Further, the process selected payment method request 318 can include an indication of the transaction amount. The transaction amount can include the total price of all items in the virtual cart of commerce application 104*a*. Additionally, the transaction amount can include the transaction fees charged by the payment aggregator system 108*a* for processing the transaction. Still further, the process selected payment method request 318 can include a transaction identifier for use in reconciling transactions between the commerce application 104*a*, the network application 218/e-commerce payment facilitator 106*a*, and the payment aggregator system 108*a*. Moreover, the process selected payment method request 318 can include an indication of a callback function to the network application 218/e-commerce payment facilitator 106*a*, which the payment aggregator system 108*a* can invoke to confirm completion of payment for the transaction.

As FIG. 3B illustrates, in response to the process selected payment method request 318, the payment aggregator system 108*a* provides a process selected payment method checkout screen 320. For example, the process selected payment method checkout screen can be provided by the payment aggregator system 108*a* in an iframe that can be displayed to the user through commerce application 104*a* or as an overlay to commerce application 104*a*.

In one or more embodiments, the process selected payment method checkout screen provides one or more fields for the user to complete in order to pay with the selected payment method. The one or more fields can prompt a user to provide one or more of the following: a first name, a middle name, a last name, a payment method number (e.g., a credit/debit card, mobile phone number, prepaid stored value card/voucher number, etc.), an expiration date (year and/or month) of the payment method number, a security code of the payment method number (e.g., a Card Verification Value (CVV or CVV2), etc.), a Personal Identification Number (PIN) of the payment method number, a billing address (e.g., including street name, house number, city, state or province, zip code, country, etc.) associated with the payment method number, a phone number associated with the payment method number, and one or more shipping addresses (e.g., including similar fields as the billing address). Additionally, the process selected payment method checkout screen can provide the user with indications of one or more of the following: the selected payment method, the payment aggregator system that is processing the transaction, the transaction amount, and the items or services being purchased. Further, the process selected payment method checkout screen can prompt the user to agree to payment terms relating to the selected payment method and/or the payment aggregator system processing the transaction. Moreover, the process selected payment method checkout screen can also provide a "Pay" or "Continue" button or other selectable element that can be selected by the user to indicate that processing of the transaction can continue using the payment method information provided by the user.

Once the user is provided with the process selected payment method checkout screen 320, the user can provide the selected payment method checkout information 322 that the payment aggregator system 108*a* requires to process the transaction. After the user inputs the selected payment method checkout information 322 requested by the payment aggregator system 108*a*, the payment aggregator system 108*a* can be provided with the selected payment method checkout information 324. In one or more embodiments, the selected payment method checkout information includes the user's input to one or more of the fields displayed by the process selected payment method checkout screen 320. Additionally, the selected payment method checkout information 324 can also include information obtained from the commerce application 104*a*, the network application 218, and/or the e-commerce payment facilitator 106*a* (e.g., information or data stored in profile storage 234).

Alternatively, in one or more embodiments, upon being provided with the process selected payment method checkout screen 320, the e-commerce payment facilitator 106*a* can auto-fill the fields of the process selected payment method checkout screen 320 with any payment information stored by the user in profile storage 234. One will appreciate in light of the disclosure herein that the e-commerce payment facilitator 106*a* may not have information for each of the fields of the process selected payment method checkout screen 320. In such instances, the user can change the auto-filled information in one or more fields or add information in any blank fields.

Upon receiving the selected payment method checkout information 324, the payment aggregator system 108*a* can process the transaction with the selected payment method using the payment aggregator system 108*a*. In one embodiment, the payment aggregator system 108*a* can process the transaction by sending at least a portion of the selected payment method checkout information 324 to a payment service provider system, such as payment service provider system 110 of FIG. 1, associated with the selected payment method. Alternatively, in another embodiment, the payment aggregator system 108*a* can process the transaction by sending at least a portion of the selected payment method checkout information 324 to a banking system, such as banking system 112 of FIG. 1.

As FIG. 3B illustrates, once processing of the transaction using the selected payment method is finished, the payment aggregator system 108*a* can return a transaction ID and a payment response to the e-commerce payment facilitator 106*a* as indicated by 326. The transaction ID and payment response can allow the payment aggregator system 108*a* to update the e-commerce payment facilitator 106*a* and/or the commerce application 104*a* with updates regarding the transaction (e.g., transaction initiated, completed, or failed). The e-commerce payment facilitator 106*a* can then forward the transaction ID and payment response 328 to the commerce application 104*a*. Alternatively, the payment aggregator system 108*a* can provide the transaction ID and payment response directly to the commerce application 104*a*. The transaction ID can allow the commerce application 104*a* to query the e-commerce payment facilitator 106*a* and/or the payment aggregator system 108*a* regarding the transaction, if necessary.

One will appreciate in light of the disclosure herein that the monetary amount of the transaction can be credited to an account of the commerce application 104*a* directly from the payment aggregator system 108*a* and the corresponding payment aggregator network 114*a*, and not from an account of the network application 218 or the e-commerce payment facilitator 106*a*. Thus, from the perspective of the commerce application 104*a*, the financial result can appear as if the user had completed the checkout process using a preexisting checkout system of the commerce application 104*a* (i.e., funds can be deposited into the same account from the components of the payment aggregator network 114*a*). Additionally, the commerce application 104*a* can benefit from the increased number of payment methods provided by the e-commerce payment facilitator 106*a* having relationships with multiple payment aggregator system, thereby reducing the potential for abandoned shopping carts, canceled transactions, and dissatisfied users.

Referring now to FIGS. 4A-4B, illustrations of transaction routing tables for processing transactions through multiple payment aggregators are provided. FIG. 4A illustrates a transaction routing table 400 that includes payment methods 402 and payment aggregator systems 404, which are assigned transaction routing ranges for each payment method. Each payment aggregator system 404 can support the processing of one or more payment methods.

In one or more embodiments, an administrative user can manually create transaction routing table 400 for use by e-commerce payment facilitator 106*a* of FIG. 2. For example, the administrative user can identify the payment aggregator systems 404 with which e-commerce payment facilitator 106*a* has relationships and/or accounts. The administrative user can also identify the payment methods 402 supported by the payment aggregator systems 404. Then, the administrative user can assign transaction routing ranges (e.g., routing percentage ranges) for each payment method in 402 with respect to each payment aggregator system in 404 that supports that particular payment method. The sum of the transaction routing ranges for each payment method 402 (i.e., table row) typically equals 100%. After assigning the transaction routing ranges, transaction routing table 400 can be stored as a resource file, database, PHP document, XML document, or any other suitable digital format or data structure. Additionally, the transaction routing table 400 can be stored in payment aggregator selector 228 of e-commerce payment facilitator 106*a*.

In one or more other embodiments, transaction routing table 400 is generated by e-commerce payment facilitator 106*a* of FIG. 2. For example, e-commerce payment facilitator 106*a* can identify payment methods 402 as the rows of transaction routing table 400 (e.g., through use of payment method manager 230). Additionally, e-commerce payment facilitator 106*a* can identify payment aggregator systems 404 as the columns of transaction routing table 400 (e.g., through use of payment aggregator selector 228). Further, e-commerce payment facilitator 106*a* can assign the transaction routing ranges (e.g., routing percentage ranges) of transaction routing table 400 using a variety of methods. In one embodiment, the transaction routing ranges can be assigned based on the transaction fees of payment aggregator systems 404 stored in pricing database 232 (e.g., assigning the initial 50% of transactions to the payment aggregator system with the lowest transaction fees, assigning the next 30% of transactions to the payment aggregator system with the second lowest transaction fees, and assigning the last 20% of transactions to the payment aggregator network with the third lowest transactions fees). In another embodiment, the transaction routing ranges can be assigned based on previous transactions stored in transaction database 236 (e.g., assigning percentage ranges of transactions to payment aggregators based on the proportion of transactions each payment aggregator has historically processed).

Once the transaction routing table 400 is created, in one or more embodiments the e-commerce payment facilitator 106*a* can use the transaction routing table 400 to route transactions to one of the payment aggregator systems 404. For example, as FIG. 4A shows, e-commerce payment facilitator 106*a* can route 30% of transactions using payment method A to payment aggregator system X, 33% of transactions using payment method A to payment aggregator system Y, and 34% of transactions using payment method A to payment aggregator system Z. In one or more embodiments, transactions for a particular payment method can be routed to only one payment aggregator system (e.g., FIG. 4A showing payment method C with 100% of transactions routed to payment aggregator system X) or to less than all the available payment aggregators (e.g., FIG. 4A showing payment method B with 50% of transactions routed to payment aggregator system X and 50% of transactions routed to payment aggregator system Y).

In one or more embodiments, once e-commerce payment facilitator 106*a* receives a user ID for a transaction (e.g., as described above with respect to step 306 in FIG. 3A), the e-commerce payment facilitator 106*a* can use the user ID and transaction routing table 400 to determine which payment aggregator will be assigned to process each available payment method the user may select. For example, if a user ID of Ser. No. 10/000,075 is received, then e-commerce payment facilitator 106*a* can compute a transaction routing value (e.g., hashed user ID h of 76 using the hash function described above with respect to step 310 of FIG. 3A). Given a transaction routing value (e.g., hashed user ID h of 76), e-commerce payment facilitator 106*a* can then refer to transaction routing table 400 to determine a payment aggregator for each available payment method. In particular, e-commerce payment facilitator 106*a* can determine that payment methods A, D, and E would be routed to payment aggregator system Z (because h=76 is within the transaction routing range assigned to payment aggregator system Z for those payment methods), payment method B would be routed to payment aggregator system Y (because h=76 is within the transaction routing range assigned to payment aggregator system Y for that payment method), and payment method C would be routed to payment aggregator system X (because h=76 is within the transaction routing range assigned to payment aggregator system X for that payment method). Once a payment aggregator system to process each available payment method is determined, e-commerce payment facilitator 106*a* can provide the available payment methods and an indication of the determined payment aggregators to the commerce application (e.g., as described with respect to step 312 of FIG. 3A).

One will appreciate in light of the disclosure herein that identifying a payment aggregator system to process a particular payment method can occur either before the user selects a payment method for the transaction (e.g., as shown and described with respect to FIGS. 3A-3B) or after the user selects a payment method for the transaction. In one or more embodiments, the user can select a payment method for the transaction and, in response to that selection, the e-commerce payment facilitator 106*a* can use transaction routing table 400 to determine the assigned payment aggregator system.

FIG. 4B illustrates a transaction routing table 406 for routing mobile phone carrier-billing payments that includes mobile payment methods 408 (i.e., mobile phone service providers/carriers) and mobile payment aggregators 410 assigned transaction routing ranges for each mobile payment method. Each mobile payment aggregator within the mobile payment aggregators 410 can support the processing of one or more mobile payment methods.

In one or more embodiments, transaction routing table 406 can be generated, stored, and used in a manner similar to that described in the foregoing with respect to transaction routing table 400 of FIG. 4A. One will appreciate in light of the disclosure herein that, in one or more embodiments, a global transaction routing table can be generated, stored, and used to route transactions for all payment methods to one or more of the payment aggregators with which e-commerce payment facilitator 106*a* has relationships. Alternatively, e-commerce payment facilitator 106*a* can generate, store, and use separate transaction routing tables for particular payment methods. For example, transaction routing table 400 can be used by e-commerce payment facilitator 106*a* to route transactions using alternative payment methods (e.g., prepaid stored value cards/vouchers), while transaction routing table 406 can be used by e-commerce payment facilitator 106*a* to route transactions using mobile phone payment methods (e.g. mobile phone carrier-billing services). Still further, one or more additional transaction routing tables can be used by e-commerce payment facilitator 106*a* to route transactions using traditional payment methods, such as credit/debit cards, and other alternative payment methods, such as virtual wallets.

In light of the foregoing description, one will appreciate that the e-commerce payment facilitator 106*a* can provide a number of benefits over conventional commerce application payment processes. As discussed above, the e-commerce payment facilitator 106*a* can exert greater control over the routing and distribution of transactions to payment aggregator systems by using transaction routing tables similar to those illustrated in FIGS. 4A-4B.

Figure 5B:
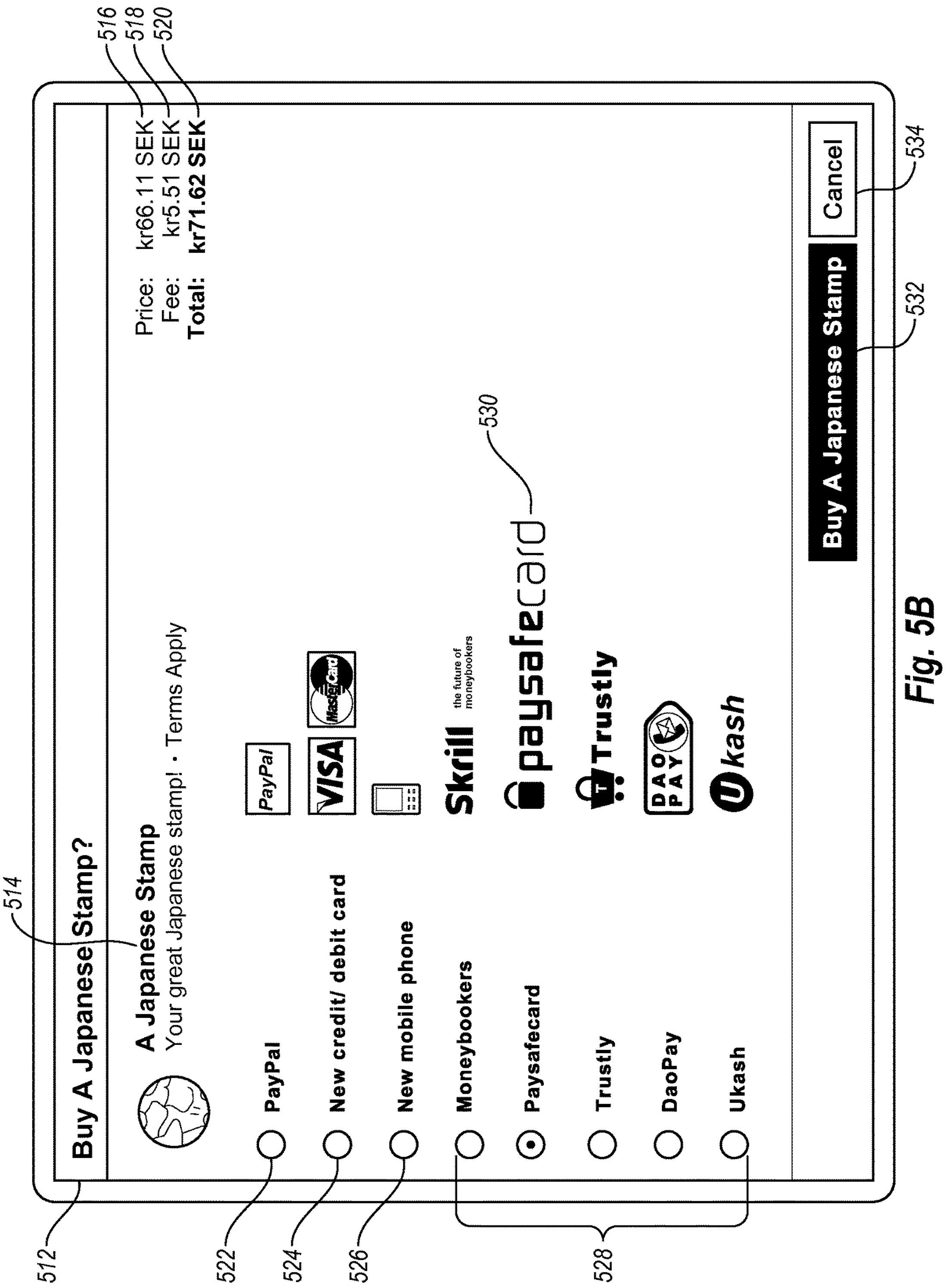
Figure 5C:
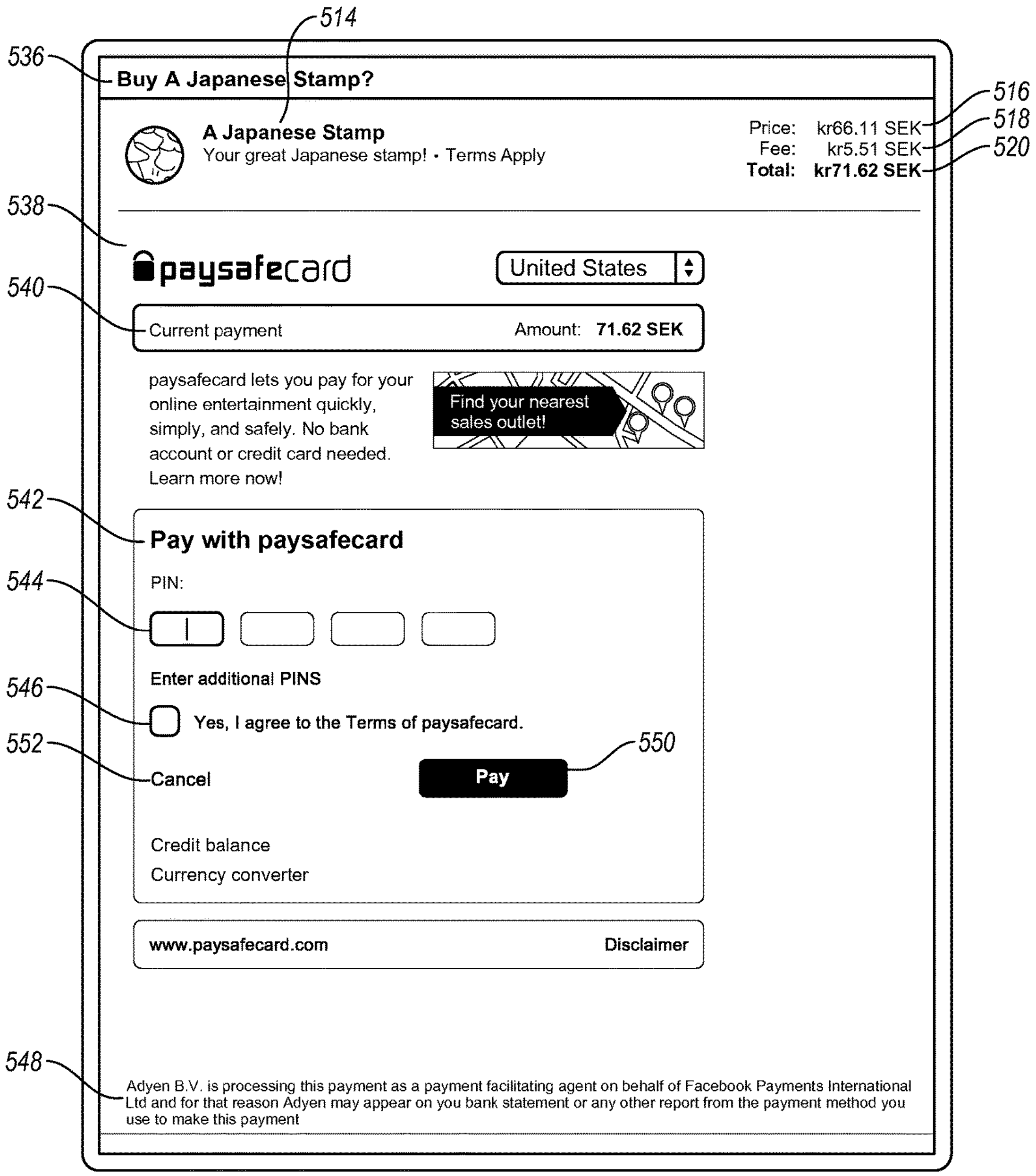

With respect to FIGS. 5A-5C, interfaces for performing a transaction from a commerce application using a payment method processed through a first payment aggregator system are illustrated. In particular, the user interfaces of FIGS. 5A-5C may be presented by a computing device 202. For example, a mobile or non-mobile computing device, such as, but not limited to, a mobile phone device, a tablet device, a handheld device, a laptop computer, a personal-digital assistant device, and/or any other suitable device can present the user interfaces of FIGS. 5A-5C.

In presenting the user interfaces of FIGS. 5A-5C, computing device 202 may include and/or be associated with a touch screen by way of which the user interfaces may be presented and/or by way of which user input may be received and/or detected. Additionally or alternatively, computing device 202 may include any other suitable input device (e.g., a mouse, a keyboard, a keypad, one or more input buttons, etc.). In some examples, a user may use the touch screen of computing device 202 to provide one or more touch gestures, interact with the interfaces, select a payment method, and/or provide selected payment method information.

FIG. 5A illustrates a user interface 500 of a commerce application 104*a* that allows a user to select one or more goods or services to purchase. In particular, FIG. 5A illustrates that a user can select an item for a purchase price 502 of $10 in the purchase price currency 504 of U.S. Dollars. In addition, as FIG. 5A shows, the user interface 500 can allow the user to specify a preferred currency 506 for the transaction. Moreover, user interface 500 can allow the user to specify their geographic location (e.g., current country) 508. As described above, in one or more embodiments, the user's geographic location can be used to determine the available payment methods for a particular transaction. However, while the embodiment shown by user interface 500 of FIG. 5A can allow the user to specify a preferred currency 506 and a geographic location 508, in one or more other embodiments, the commerce application 104*a* does not allow the user to specify these fields. Instead, in one or more other embodiments, the commerce application 104*a* can rely on the user's preferred currency as stored in the user's profile and/or the stored or detected geographic location of the user's computing device, as previously described. Furthermore, in one or more other embodiments, the e-commerce payment facilitator 106*a* can determine a user's geographic location (e.g., current country) based on a variety of factors, such as information stored in the user's profile, the IP address of the user's last login, and/or the current IP address of the user's computing device.

Further, the user interface 500 includes a selectable element (e.g., a "Pay with Facebook" button) operable by the user to begin the checkout process (e.g., to complete the purchase of the items in the cart). In one or more embodiments, upon the user selecting the button 510, the commerce application 104*a* can send the user ID and cart information to the e-commerce payment facilitator 106*a*, as described above in relation to FIG. 3A. Additionally or alternatively, selection of the button 510 by the user can invoke a client-side API request (i.e., an API call from computing device 202) to the e-commerce payment facilitator 106*a* that requests the display of a pay dialog, such as FIG. 5B. In response to the user's selection of button 510, the e-commerce payment facilitator 106*a* can determine the available payment methods for the transaction and also determine a payment aggregator system to process each particular available payment method, as described above in relation to FIG. 3A. In one or more embodiments, once the available payment methods and the corresponding payment aggregator systems are provided, the commerce application 104*a* can render a checkout screen with the available payment methods, as described above in relation to FIG. 3A. However, in one or more other embodiments, e-commerce payment facilitator 106*a* can render the checkout screen with the available payment methods.

Thus, one will appreciate that the button 510 can be implemented, rendered, or called using any number of methods or protocols. Examples of such methods and protocols are described in more detail in U.S. patent application Ser. No. 14/037,357, filed Sep. 25, 2013, entitled "Dynamically Providing a Third-Party Checkout Option." Moreover, one will appreciate that payments can be processed using a variety of methods and systems. Examples of such methods and systems are described in more detail in U.S. patent application Ser. No. 14/037,349, filed Sep. 25, 2013, entitled "Methods and Systems for Facilitating E-Commerce Payments." The entire contents of each of the foregoing applications are hereby incorporated by reference in their entirety.

Upon the user selecting a selectable element 510 (e.g., a "Pay with Facebook" button) of FIG. 5A, a second user interface 512 can be displayed as shown by FIG. 5B. The second user interface 512 of FIG. 5B can allow the user to select a payment method for the transaction. In particular, the second user interface 512 can provide an indication of the item for purchase 514, as well as an indication of the purchase price 516, the transaction fees 518, and the transaction total 520. Additionally, the second user interface 512 can show the purchase price 516, transaction fees 518, and transaction total 520 in the user's preferred currency, as opposed to the purchase price currency 504 of the item for purchase.

Further, the second user interface 512 can provide the user with one or more selectable options for available payment methods. Specifically, the second user interface 512 can provide a selectable option for a virtual wallet payment method 522, such as the PayPal™ payment service. The second user interface 512 can also provide a selectable option for a credit/debit card payment method 524, such as the VISA™ or MASTERCARD™ credit/debit card services. Further, the second user interface 512 can provide a selectable option for a mobile phone carrier-billing service payment method 526, as well as one or more selectable options for alternative payment methods 528, such as the SKRILL™, PAYSAFECARD™, TRUSTPAY™, DAOPAY™, and UKASH™ alternative payment services. In the example shown by FIG. 5B, the user has selected the PAYSAFECARD™ payment method 530.

Once a payment method from the second user interface 512 is selected, the user can select a selectable element 532 (e.g., a "Buy," "Pay," or "Continue" button) to continue the transaction by paying with the selected payment method. Alternatively, the user can select another selectable element 534 (e.g., a "Cancel" or "Quit" button) to abort the transaction. In one or more embodiments, when the user selects the selectable element 532, commerce application 104*a* can invoke a process selected payment method checkout screen provided by the payment aggregator system that corresponds to the selected payment method, as described with respect to FIG. 3B above. Additionally or alternatively, selection of the selectable element 532 by the user can invoke a client-side API call or iframe of the payment aggregator system that corresponds to the selected payment method. One will appreciate in light of the disclosure herein that the second user interface 512 can be provided by commerce application 104*a* using available payment methods provided by e-commerce payment facilitator 106*a*. Alternatively, the e-commerce payment facilitator 106*a* can provide the second user interface 512 to the user's computing device 202, either as an overlay to commerce application 104*a*, through a web browser 204, or via an iframe.

Upon the user selecting a selectable element 532 (e.g., a "Buy," "Pay," or "Continue" button) of FIG. 5B, a third user interface 536 can be displayed as shown by FIG. 5C. The third user interface 536 can provide the user with an indication of the selected payment method 538 and an indication of the transaction total 540. Further, the third user interface 536 can prompt the user 542 to provide a payment method number into one or more fields 544. In this example, the user is prompted to provide a PAYSAFECARD™ PIN. Additionally, the third user interface 536 can provide a selectable option to indicate that the user agrees to the terms of the selected payment method 546. Further, the user can select a selectable element 550 (e.g., a "Buy," "Pay," or "Continue" button) to complete the transaction using the selected payment method. Alternatively, the user can select another selectable element 552 (e.g., a "Cancel" or "Quit" button) to abort the transaction. Still further, the third user interface 536 can provide an indication of the payment aggregator system 548 that is processing the transaction using the selected payment method. In this example, a first payment method (i.e., PAYSAFECARD™) is being processed by a first payment aggregator system (i.e. Adyen B. V. indicated at item 548). The payment aggregator system indicated at item 548 is processing this transaction as a result of being routed this transaction in accordance with a transaction routing table similar to FIGS. 4A and 4B described above. One will appreciate from the disclosure herein that the third user interface 536, or any portion thereof, can be provided by the payment aggregator system 548. For example, the third user interface 534 can be provided as an iframe on the user's computing device 202.

Figure 6A:
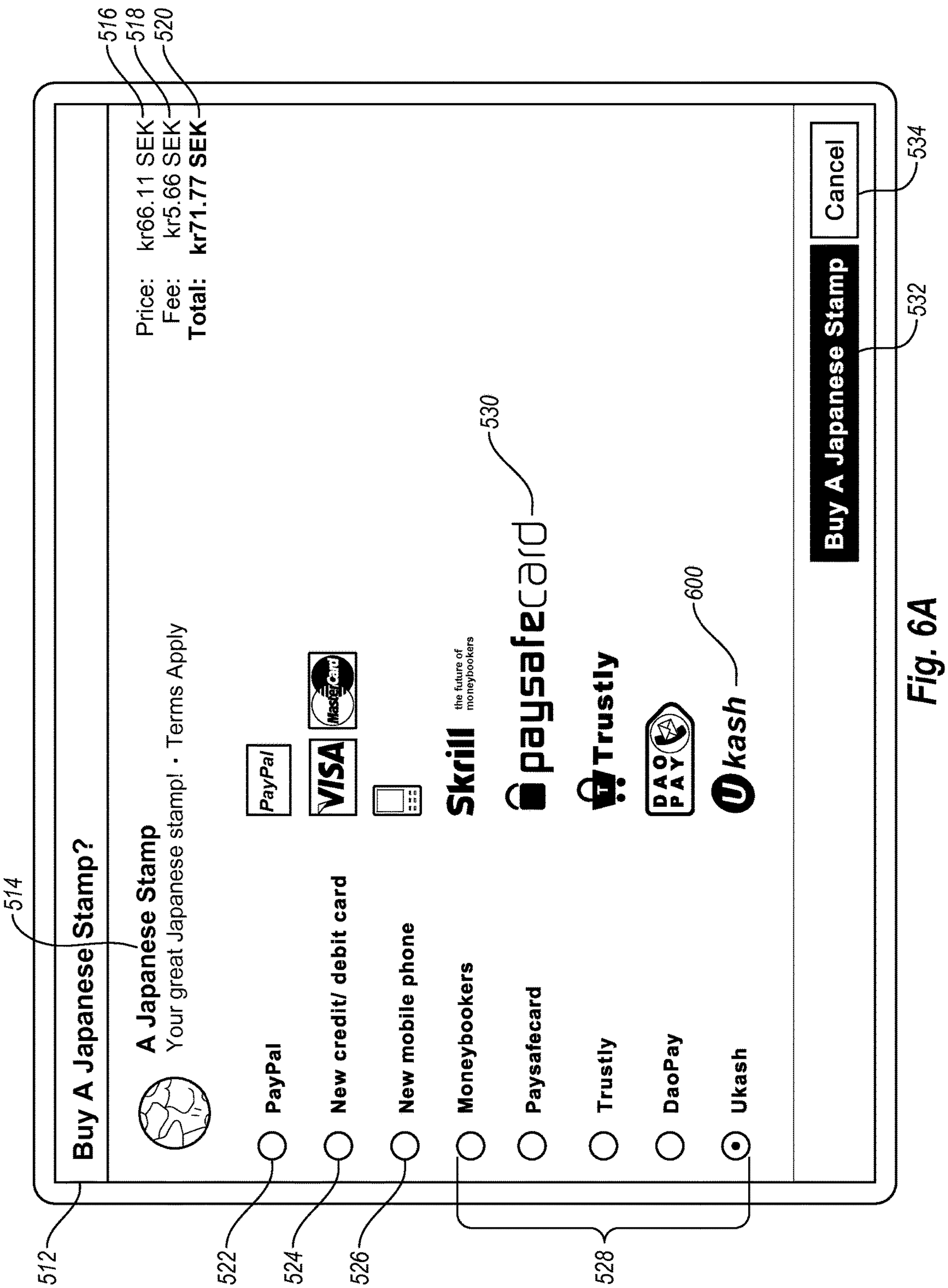
FIGS. 6A-6B illustrate user interfaces for performing a second alternative payment transaction using a second payment aggregator system in accordance with one or more embodiments.
Figure 6B:
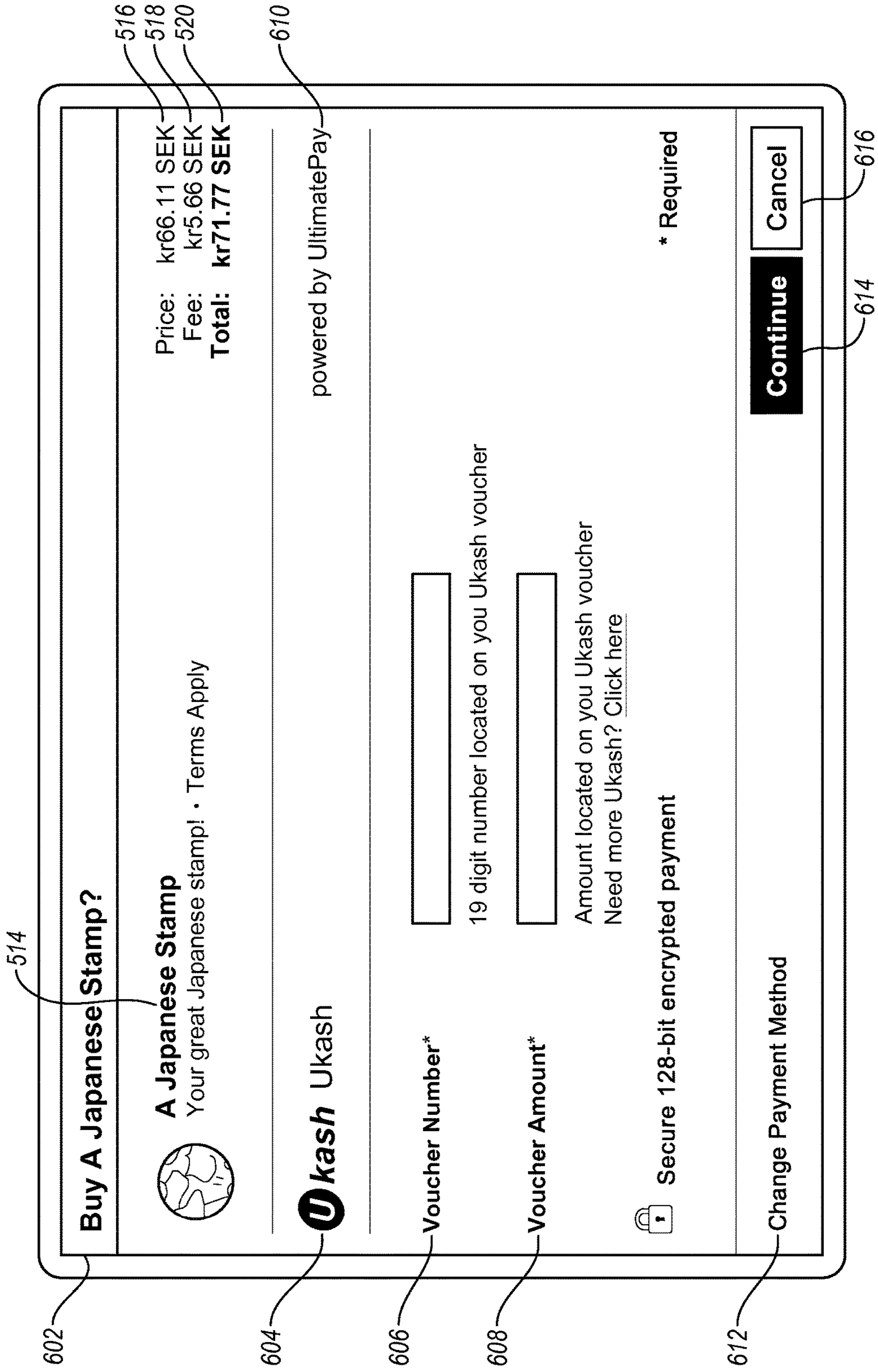

FIGS. 6A-6B illustrate user interfaces for performing a transaction from a commerce application through a second payment aggregator system. In particular, the second user interface 512 of FIG. 6A is identical to the second user interface 512 of FIG. 5B, except that FIG. 6A shows that the user has selected Ukash 600 as the selected payment method, rather than PaySafeCard as shown in FIG. 5B.

Upon the user selecting a selectable option 532 (e.g., a "Buy," "Pay," or "Continue" button) of FIG. 6A, a third user interface 602 can be displayed as shown by FIG. 6B. In one or more embodiments, when the user selects the selectable option 532, commerce application 104*a* can invoke a process selected payment method checkout screen provided by the payment aggregator system that corresponds to the selected payment method, as described with respect to FIG. 3B above. Additionally or alternatively, selection of the selectable element 532 by the user can invoke a client-side API call or iframe of the payment aggregator system that corresponds to the selected payment method.

In the example illustrated by FIG. 6B, the third user interface 602 shows an indication of the selected payment method 604, as well as an indication of the payment aggregator system 610 that is processing the transaction. Accordingly, in this example, a second payment method (i.e., UKASH™) is being processed by a second payment aggregator system (i.e. ULTIMATEPAY™ indicated at item 610). The payment aggregator system indicated at item 610 is processing this transaction as a result of being routed this transaction in accordance with a transaction routing table similar to FIGS. 4A and 4B described above. Further, the third user interface 602 can prompt the user to provide payment method information (e.g., a voucher number 606 and voucher amount 608, etc.). The third user interface 602 can also provide a selectable element 612 that allows the user to change the selected payment method. Upon the user selecting selectable element 612, the second user interface 512 of FIG. 6A can be presented to the user again. Once the user has provided the payment method information, the user can select a selectable element 614 (e.g., a "Buy," "Pay," or "Continue" button) to complete the transaction using the selected payment method. Alternatively, the user can select another selectable element 616 (e.g., a "Cancel" or "Quit" button) to abort the transaction.

Figure 7A:
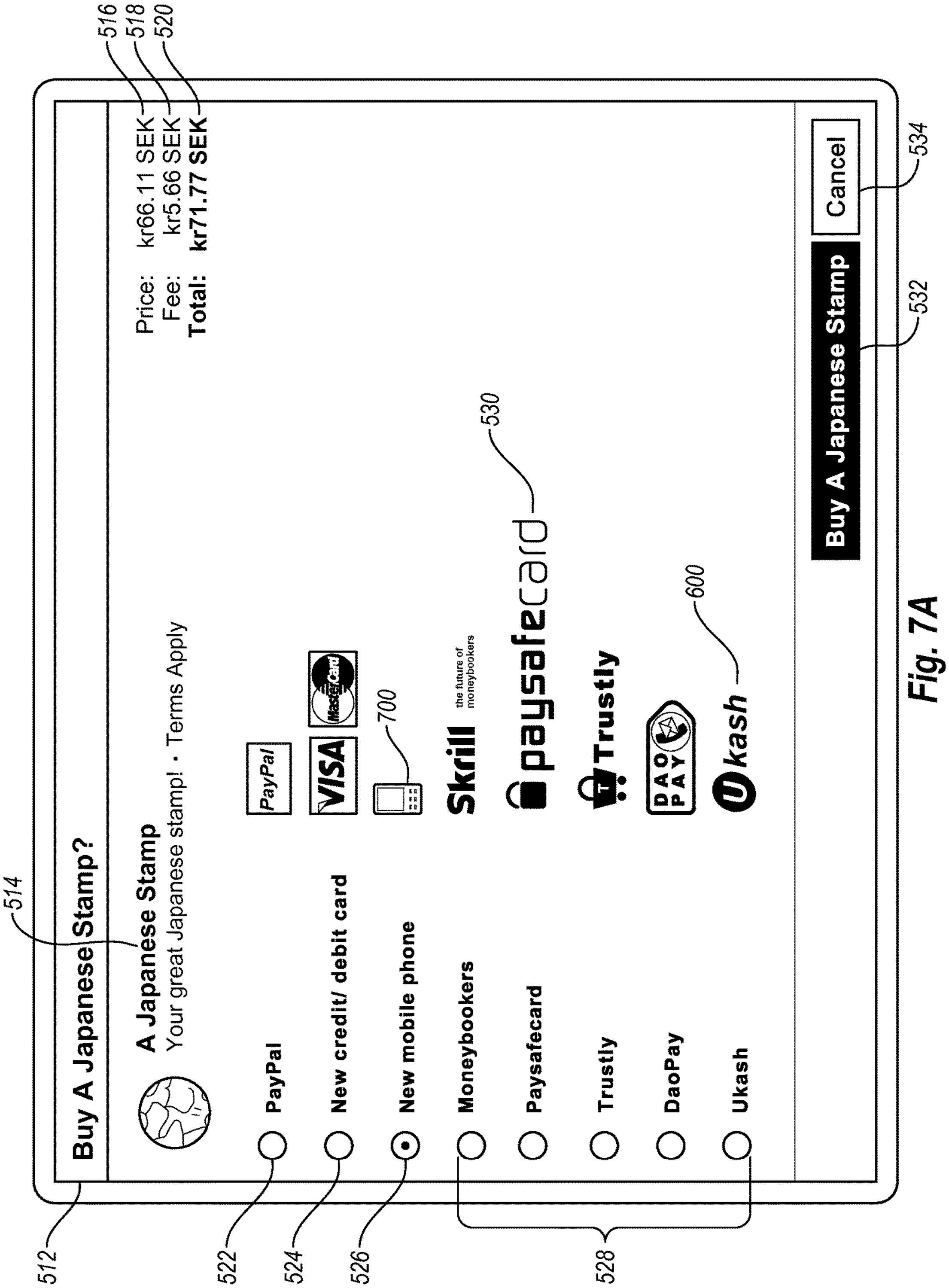
FIGS. 7A-7B illustrate user interfaces for performing a mobile alternative payment transaction using a mobile payment aggregator system in accordance with one or more embodiments.
Figure 7B:
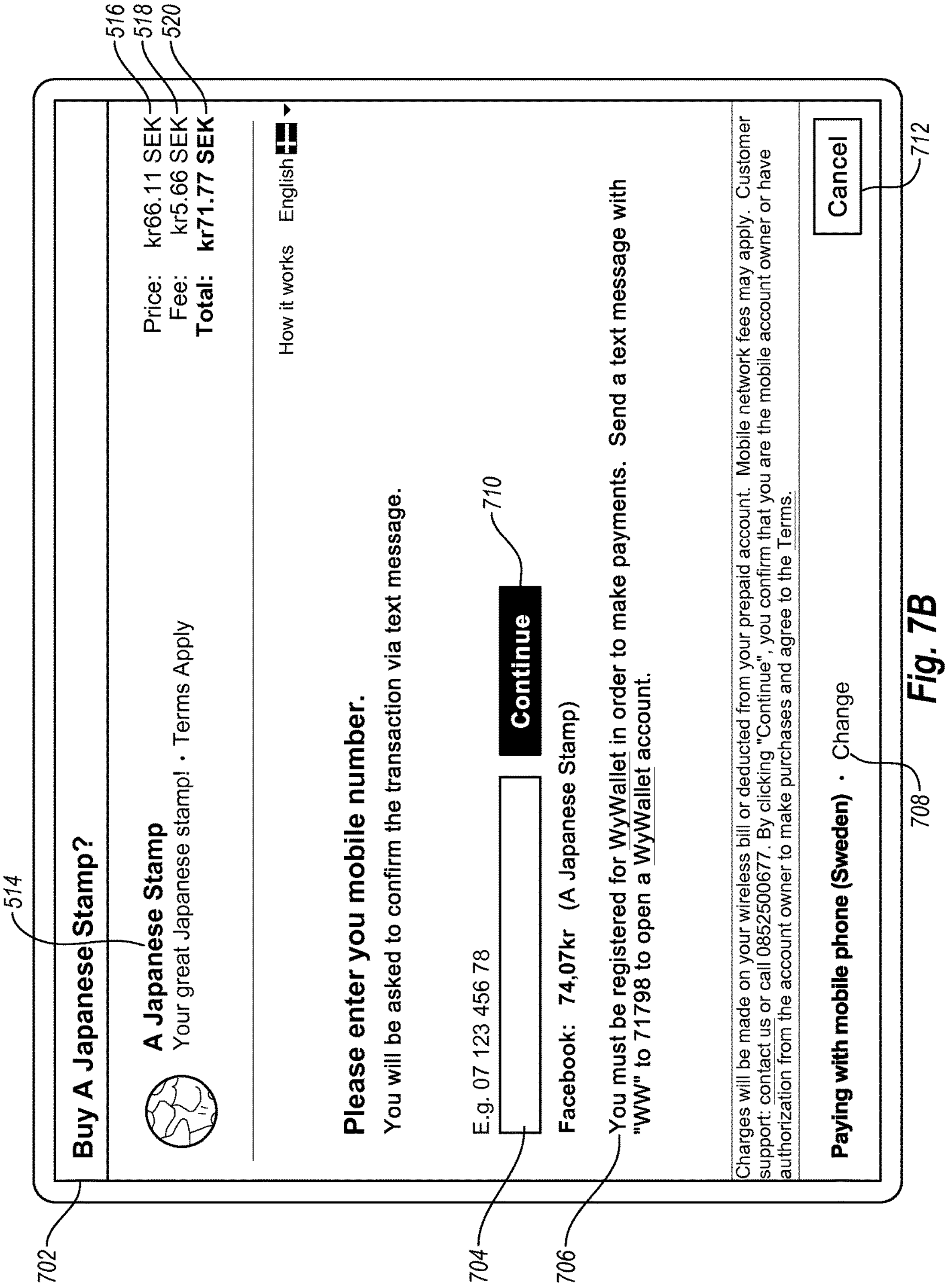

FIGS. 7A-7B illustrate user interfaces for performing a transaction from a commerce application through a mobile payment aggregator system. In particular, the second user interface 512 of FIG. 7A is identical to the second user interface 512 of FIG. 5B and the second user interface 512 of FIG. 6A, except that FIG. 7A shows that the user has selected a mobile phone carrier-billing service payment method 700 as the selected payment method, rather than PAYSAFECARD™ as shown in FIG. 5B and UKASH™ as shown in FIG. 6A.

In one or more embodiments, the second user interface 512 of FIG. 7A provides a selectable element 532 (e.g., a "Buy," "Pay," or "Continue" button), which the user can select to invoke the process selected payment method checkout screen provided by the payment aggregator system that corresponds to the selected payment method.

As depicted in FIG. 7A, the mobile phone carrier-billing service payment method 700 is selected, therefore, upon selection of button 532, the user can begin to process the selected payment method through the corresponding payment aggregator system. In one or more embodiments, selection of the selectable element 532 by the user can invoke a client-side API call or iframe of the payment aggregator system that corresponds to the selected payment method. Additionally, a transaction routing table, such as transaction routing table 406 of FIG. 4B, can be used by e-commerce payment facilitator 106*a* to determine the payment aggregator system that will process the mobile phone carrier-billing service payment method 700.

In response to the user selecting the selectable option 532 of FIG. 7A, a third user interface 702 can be displayed as shown by FIG. 7B. The third user interface 702 can present one or more fields 704 which the user can use to provide a payment method number (e.g., a mobile phone number). The third user interface 702 can also present an indication of the payment aggregator system 706 that is processing this transaction. In this example, a mobile phone carrier-billing service payment method (i.e., mobile phone number) is being processed by a mobile payment aggregator system (i.e., WYWALLET™ indicated at item 706). As with FIG. 6B, the third user interface 702 can provide a selectable element 708 that allows the user to change the selected payment method, and upon the selection of selectable element 708, the second user interface 512 of FIG. 7A can be presented to the user. Further, the third user interface 702 can provide a selectable element 710 (e.g., a "Buy," "Pay," or "Continue" button) that allows the user complete the transaction and a selectable element 712 (e.g., a "Cancel" or "Quit" button) that allows the user to abort the transaction.

FIGS. 1-7B, the corresponding text, and the examples, provide a number of different systems and devices for facilitating purchases using payment aggregator systems. In addition to the foregoing, embodiments also can be described in terms of flowcharts comprising acts and steps in a method for accomplishing a particular result. For example, FIGS. 8-9 illustrate flowcharts of exemplary methods in accordance with one or more embodiments.

Figure 8:
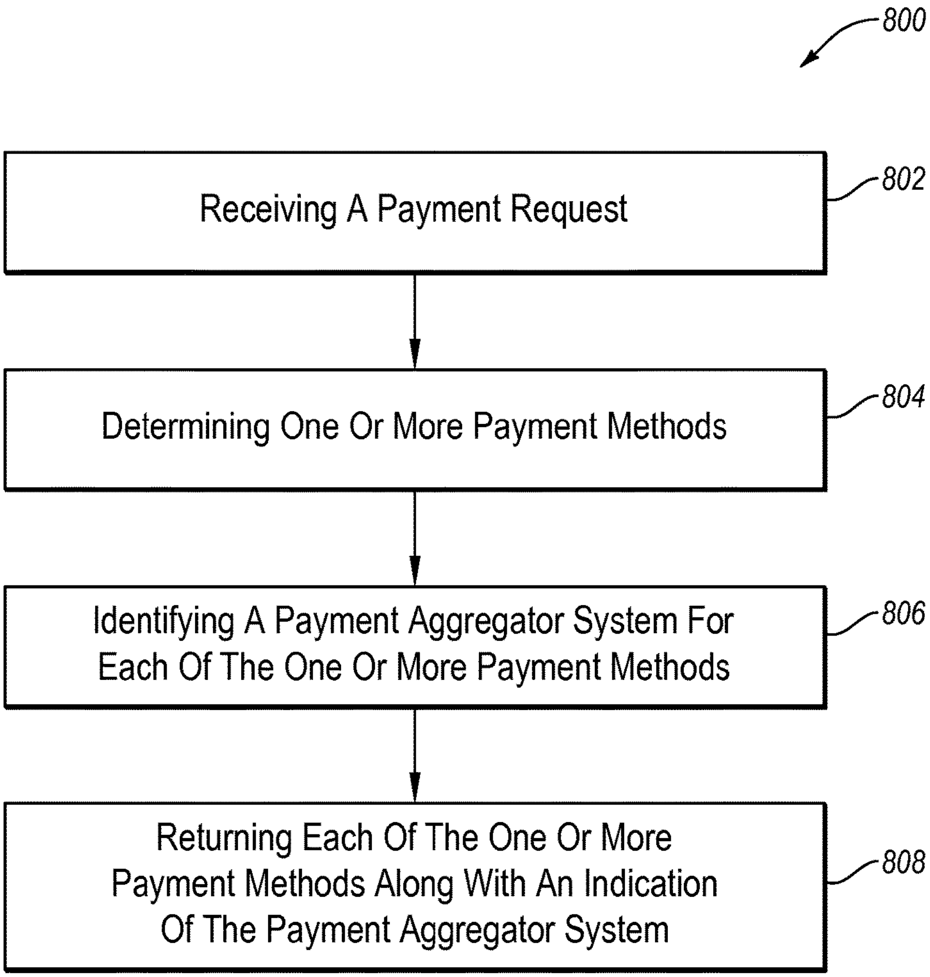
FIG. 8 illustrates a flowchart of a series of acts in a method of facilitating a financial transaction using a payment aggregator system in accordance with one or more embodiments.
Figure 9:
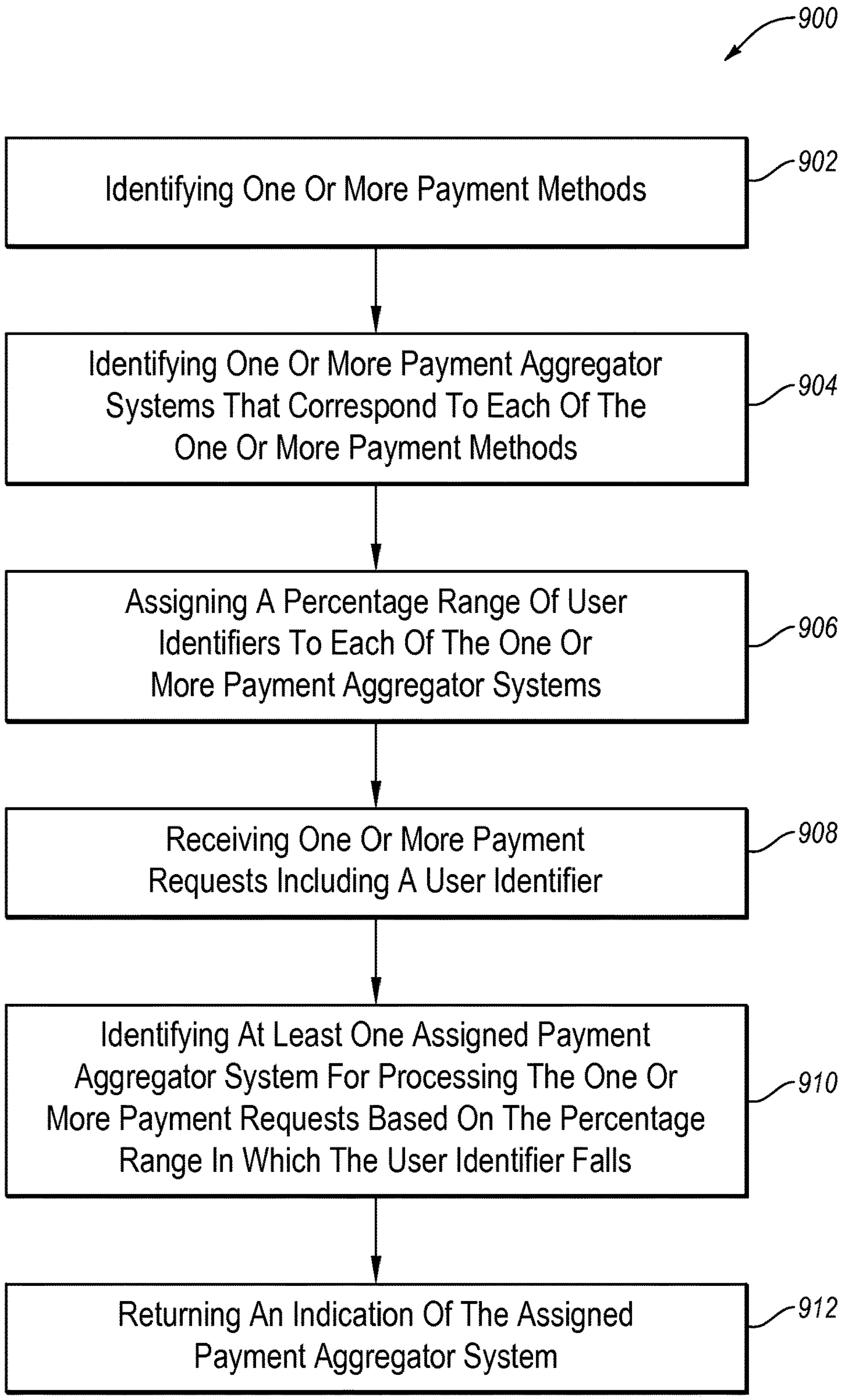
FIG. 9 illustrates a flowchart of a series of acts in a method of facilitating a financial transaction using a payment aggregator system in accordance with one or more embodiments.

FIG. 8 illustrates a flowchart of one exemplary method 800 of facilitating a financial transaction from a commerce application to a payment aggregator system from the perspective of an e-commerce payment facilitator 106*a* or a network application 218. The method 800 can include an act 802 of receiving a payment request. In particular, act 802 can comprise receiving a request 306 from a commerce application 104*a*. The request 306 can comprise a user identification of a user and a transaction amount for one or more items or services selected for purchase from the commerce application 104*a*. In one or more embodiments, receiving the request 306 can comprise receiving a client-side API request that seeks to invoke an available payment methods user interface (e.g., pay dialog) provided by e-commerce payment facilitator 106*a* or network application 218.

The method 800 may also include an act 804 of determining one or more payment methods. In particular, act 804 can involve determining a geographic location of a user or a user's computing device (e.g., current country) and identifying the one or more payment methods available for financial transactions in that geographic location. More specifically, a payment method manager 230 of server computing device(s) 216 can lookup a mapping of countries to available payment methods stored in a table, database, or other suitable data structure. Alternatively, act 804 can involve determining a country that issues a preferred currency of a user and identifying the one or more payment methods available for financial transactions in that country.

FIG. 8 further illustrates that the method 800 can include an act 806 of identifying a payment aggregator system for each of the one or more payment methods. In particular, act 806 can involve accessing one or more transaction routing tables, such as transaction routing tables 400 or 406 of FIGS. 4A and 4B, respectively. More specifically, act 806 can involve payment aggregator selector 228 mapping a user identifier to a payment aggregator system for each available payment method determined in act 804. For example, mapping a user identifier in act 806 can involve hashing a user identifier to obtain a hashed user identifier and then comparing the hashed user identifier to a percentage range assigned to each payment aggregator system capable of processing each available payment method.

Further, the method 800 can include an act 808 of returning each of the one or more payment methods along with an indication of the payment aggregator system. Specifically, act 808 can involve server computing device(s) 216 sending, to a computing device and in response to a client-side API request, indications of available payment methods and the payment aggregator system corresponding to each available payment method.

Referring now to FIG. 9, a flowchart of one exemplary method 900 of facilitating a financial transaction from a commerce application to a payment aggregator system from the perspective of an e-commerce payment facilitator 106*a* or a network application 218 is illustrated. As shown the method 900 can include an act 902 of identifying one or more payment methods. For example, act 902 can involve using the payment method manager 230 to identify the payment methods supported by the payment aggregator systems with which the e-commerce payment facilitator 106*a* has relationships. Further, in one or more embodiments, act 902 can include referencing a static document or data structure that stores indications of payment methods supported by e-commerce payment facilitator 106*a*. Alternatively, in one or more embodiments, act 902 can include dynamically generating a document or data structure that provides an indication of the payment methods supported by e-commerce payment facilitator 106*a*. Further, in one or more embodiments, act 902 can include a call to a server-side API (i.e., an API call from server computing device(s) 216) of the network application 218.

The method 900 can also include an act 904 of identifying one or more payment aggregator systems that correspond to each of the one or more payment methods. In particular, act 904 can involve e-commerce payment facilitator 106*a* using payment aggregator selector 228 to identify one or more payment aggregator systems with which e-commerce payment facilitator 106*a* has established relationships. More specifically, act 904 can involve querying each payment aggregator system to determine whether each payment method identified in act 902 is supported. Alternatively, act 904 can involve referencing a static or dynamic document or data structure that stores indications of payment aggregator systems and the payment methods supported by those payment aggregator systems. In one or more embodiments, act 904 can involve a server-side API call of the network application 218.

Further, FIG. 9 illustrates that method 900 can include an act 906 of assigning a percentage range of user identifiers to each of the one or more payment aggregator systems. For example, act 906 can involve populating a table, database, or other data structure, such as the transaction routing table 400 in FIG. 4A, with transaction routing ranges for each payment method across each payment aggregator system that supports that payment method. Further, in one or more embodiments, act 906 can involve e-commerce payment facilitator 106*a* accessing static ranges stored in a transaction routing table. Alternatively, in one or more embodiments, act 906 can involve e-commerce payment facilitator 106*a* dynamically determining a range of user identifiers to assign to each payment aggregator system according to an analysis of one or more metrics, such as transaction fees, reliability score, availability score, transaction conversion rate, or profitability score (e.g., based on data or information stored in pricing database 232, profile storage 234, or transaction database 236). Further, in one or more embodiments, act 906 can involve a server-side API call.

Method 900 can also include an act 908 of receiving one or more payment requests including a user identifier. In particular, act 908 can involve e-commerce payment facilitator 106*a* receiving a user identifier and cart information from a commerce application 104*a*, as described above with respect to step 306 of FIG. 3A. In one or more embodiments, act 908 can involve a client-side API call that invokes a pay dialog, such at the user interface 512 of FIG. 5B.

Further, method 900 can involve an act 910 of identifying at least one assigned payment aggregator system for processing the one or more payment requests. In particular, act 910 can involve transforming the user identifier to a value within the numerical range of 1 to 100. More specifically, act 910 can include computing a hashed user identifier using a hash function, as described in the foregoing with respect to FIG. 3A. In one or more embodiments, act 910 can involve determining a payment method selected by a user associated with the user identifier and transforming the user identifier to fall within a percentage range assigned to a payment aggregator system that supports the selected payment method. Alternatively, in one or more embodiments, act 910 can involve determining one or more payment methods available to a user based on the user's current country and transforming the user identifier of the user to fall within a percentage range assigned to a payment aggregator system that supports each available payment method.

FIG. 9 also shows that method 900 can include an act 912 of returning an indication of the assigned payment aggregator system. For example, act 912 can involve e-commerce payment facilitator 106*a* providing commerce application 104*a* with a URL of the assigned payment aggregator system. Alternatively, act 912 can involve e-commerce payment facilitator 106*a* providing commerce application 104*a* with code for invoking a client-side API call or iframe of the assigned payment aggregator system. In one or more embodiments, act 912 can also include redirecting a user 102 or commerce application 104*a* to the assigned payment aggregator.

Embodiments may comprise or use a special purpose or general-purpose computer including computer hardware, such as, for example, one or more processors and system memory, as discussed in greater detail below. Embodiments within the scope also include physical and other computer-readable media for carrying or storing computer-executable instructions and/or data structures. In certain particular embodiments, one or more of the processes described herein may be implemented at least in part as instructions embodied in a non-transitory computer-readable medium and executable by one or more computing devices (e.g., any of the media content access devices described herein). In general, a processor (e.g., a microprocessor, etc.) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, one or more embodiments can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) use transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of one or more embodiments. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the one or more embodiments may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. One or more embodiments may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service (SaaS), Platform as a Service (PaaS), and Infrastructure as a Service (IaaS). A cloud computing model can also be deployed using different deployment models such as private cloud, community cloud, public cloud, hybrid cloud, and so forth. In this description and in the claims, a "cloud computing environment" is an environment in which cloud computing is employed.

Figure 10:
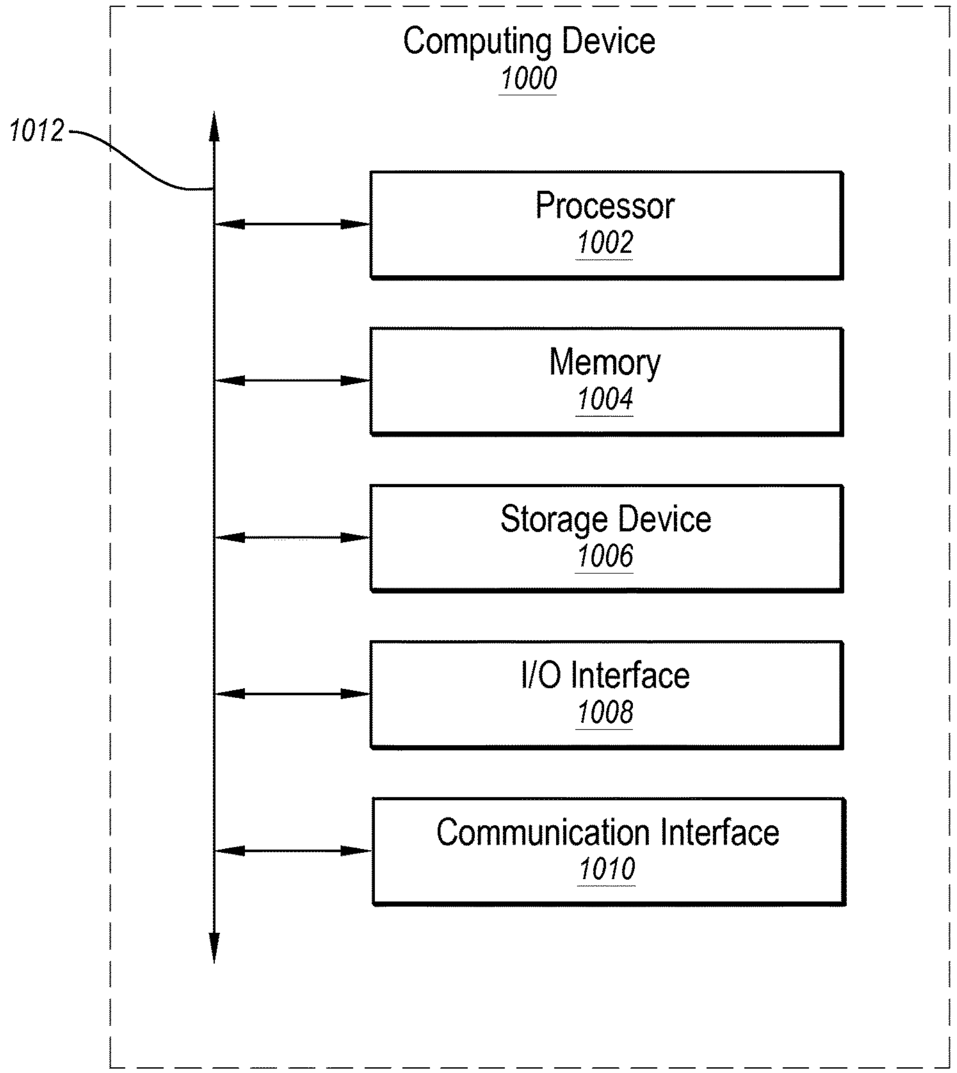
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that the computing device 202, server computing device 214, and server computing device 216 can each comprise implementations of the data-computing device 1000. As shown by FIG. 10, the computing device can comprise a processor 1002, memory 1004, a storage device 1006, an I/O interface 1008, and a communication interface 1010. While an exemplary computing device 1000 is shown in FIG. 10, the components illustrated in FIG. 10 are not intended to be limiting. Additional or alternative components may be used in other embodiments. Furthermore, in certain embodiments, a computing device 1000 can include fewer components than those shown in FIG. 10. Components of computing device 1000 shown in FIG. 10 will now be described in additional detail.

In particular embodiments, processor(s) 1002 includes hardware for executing instructions, such as those making up a computer program. As an example and not by way of limitation, to execute instructions, processor(s) 1002 may retrieve (or fetch) the instructions from an internal register, an internal cache, memory 1004, or a storage device 1006 and decode and execute them. In particular embodiments, processor(s) 1002 may include one or more internal caches for data, instructions, or addresses. As an example and not by way of limitation, processor(s) 1002 may include one or more instruction caches, one or more data caches, and one or more translation lookaside buffers (TLBs). Instructions in the instruction caches may be copies of instructions in memory 1004 or storage device 1006.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory (RAM), Read Only Memory (ROM), a solid state disk (SSD), Flash, Phase Change Memory (PCM), or other types of data storage. The memory 1004 may be internal or distributed memory.

The computing device 1000 includes a storage device 1006 for storing data or instructions. As an example and not by way of limitation, storage device 1006 can comprise a non-transitory storage medium described above. The storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to the computing device 1000. In particular embodiments, storage device 1006 is non-volatile, solid-state memory. In particular embodiments, storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory, or a combination of two or more of these.

The computing device 1000 also includes one or more input or output (I/O) devices/interfaces 1008, which are provided to allow a user to provide input to, receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a stylus or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device 1000 and one or more other computing devices or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 1010. As an example and not by way of limitation, computing device 1000 may communicate with an ad hoc network, a personal area network (PAN), a local area network (LAN), a wide area network (WAN), a metropolitan area network (MAN), or one or more portions of the Internet, or a combination of two or more of these. One or more portions of one or more of these networks may be wired or wireless. As an example, computing system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 1000 may include any suitable communication interface 1010 for any of these networks, where appropriate.

The computing device 1000 can further include a bus 1012. The bus 1012 can comprise hardware, software, or both that couples components of computing device 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the network application 218 can comprise a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., wall posts, photo-sharing, event organization, messaging, games, payments, or advertisements) to facilitate social interaction between or among users The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., a URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social networking system a request to create an edge between a user node of the user and a concept node of the concept, indicating a relationship between the user and the concept (e.g., the user "checks in" at a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo-sharing, online calendars and events, gaming, instant messaging, online payments, and advertising. For example, the social networking system may also include media sharing capabilities. Also, the social networking system may allow users to post photographs and other multimedia files to a user's profile page (typically known as "wall posts" or "timeline posts") or in a photo album, both of which may be accessible to other users of the social-networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 11:
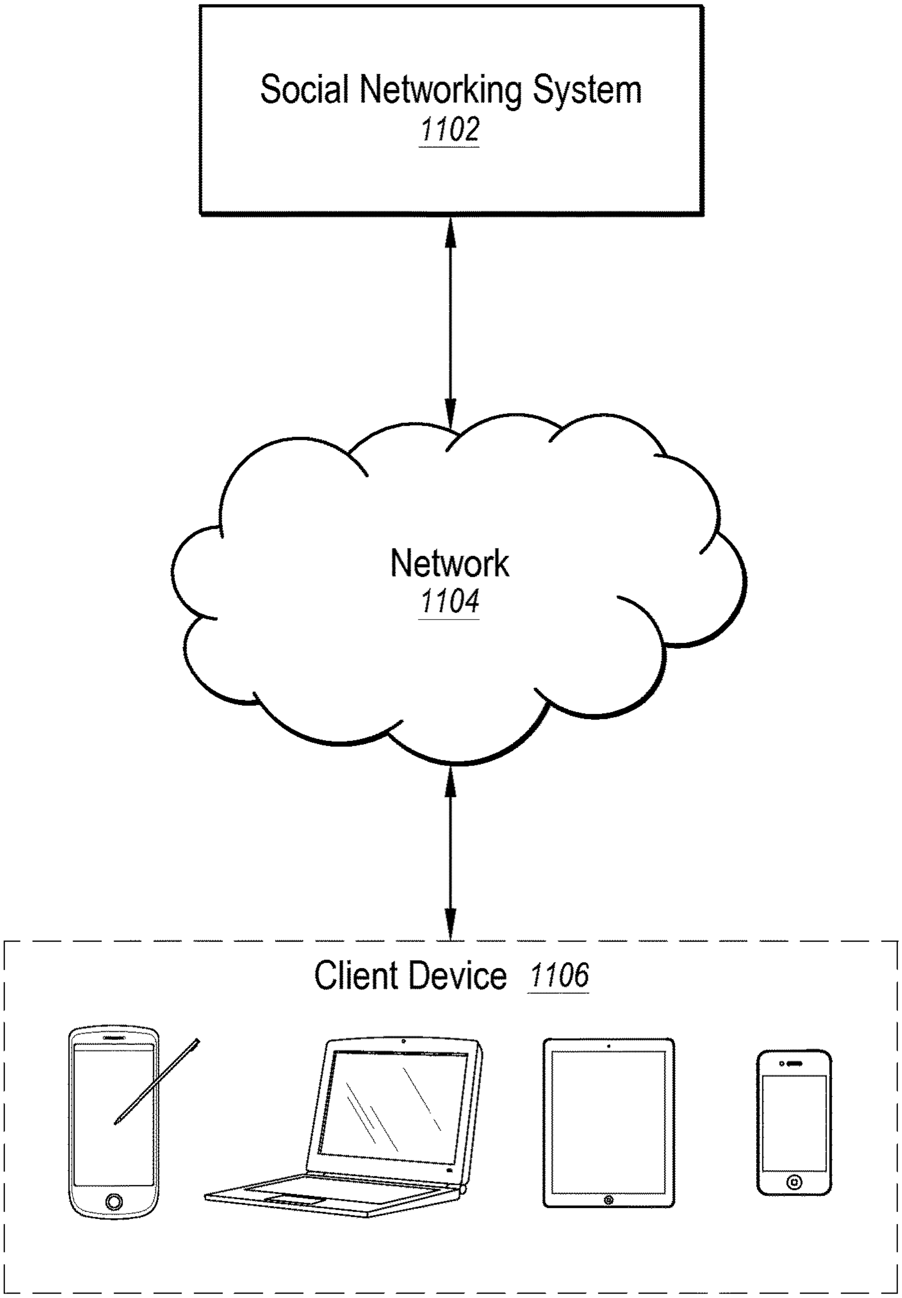
FIG. 11 illustrates an example network environment of a social networking system in accordance with one or more embodiments.

FIG. 11 illustrates an example network environment of a social networking system. In particular embodiments, a social networking system 1102 may comprise one or more data stores. In particular embodiments, the social networking system 1102 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social networking system 1102 may comprise one or more computing devices (e.g., servers) hosting functionality directed to operation of the social networking system. A user of the social networking system 1102 may access the social networking system 1102 using a client device such as client device 1106. In particular embodiments, the client device 1106 can interact with the social networking system 1102 through a network 1104.

The client device 1106 may be a desktop computer, laptop computer, tablet computer, personal digital assistant (PDA), in- or out-of-car navigation system, smart phone or other cellular or mobile phone, or mobile gaming device, other mobile device, or other suitable computing devices. Client device 1106 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over a network 1104.

Network 1104 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1106 may access the social networking system 1102.

While these methods, systems, and user interfaces use both publicly available information as well as information provided by users of the social networking system, all use of such information is to be explicitly subject to all privacy settings of the involved users and the privacy policy of the social networking system as a whole.

In the foregoing specification, various embodiments have been described with reference to specific exemplary embodiments thereof. Various embodiments and aspects are described with reference to details discussed herein, and the accompanying drawings illustrate the various embodiments. The description above and drawings are illustrative and are not to be construed as limiting. Numerous specific details are described to provide a thorough understanding of various embodiments.

One or more embodiments may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method comprising:

receiving a payment request to pay for a pending transaction, the payment request comprising a user identifier;

determining a plurality of payment method options;

generating a transaction routing value by hashing the user identifier with a hash function to calculate a hashed user identifier within a range of numbers;

generating, for each payment method option of the plurality of determined payment method options, one or more transaction routing ranges associated with a plurality of payment aggregator systems by allocating the payment method option among one or more payment aggregator systems capable of processing the payment method option, wherein the one or more transaction routing ranges map to the range of numbers;

determining, for each payment method option of the plurality of determined payment method options and by one or more server computing devices executing a network application, a payment aggregator system from the plurality of payment aggregator systems by mapping the hashed user identifier of the transaction routing value to a corresponding transaction routing percentage range of the one or more transaction routing ranges associated with the plurality of payment aggregator systems capable of processing each respective payment method option to identify the payment aggregator system;

providing, in response to the payment request, each of the plurality of determined payment method options along with an indication of the payment aggregator system identified for each of the determined payment method options;

determining, for a payment method option of the plurality of determined payment method options, that the payment aggregator system identified for the payment method option is unable to process the payment request;

identifying, based on determining that the identified payment aggregator system is unable to process the payment request, a backup payment aggregator system for the payment method option that is able to process the payment request; and returning an indication of the backup payment aggregator system as the identified payment aggregator system to process the payment method option.

2. The method as recited in claim 1, wherein the user identifier is hashed to a hashed user identifier number between 1 and 100.

3. The method as recited in claim 2, wherein the one or more transaction routing ranges determined for each payment method option of the plurality of determined payment method options is between 1 and 100 percent.

4. The method as recited in claim 3, wherein mapping the hashed user identifier of the transaction routing value comprises directly mapping a hashed user identifier number for the payment request to the payment aggregator systems allocated to the transaction routing percentage range having the percentage number matching the hashed user identifier number.

5. The method as recited in claim 1, wherein determining that the payment aggregator system identified for the payment method option is unable to process the Payment request further comprises determining that the identified payment aggregator system has a process failure.

6. The method as recited in claim 1, wherein determining that the payment aggregator system identified for the payment method option is unable to process the payment request further comprises determining that the identified payment aggregator system is unreachable.

7. The method as recited in claim 1, wherein determining that the payment aggregator system identified for the payment method option is unable to process the payment request further comprises receiving an indication that the identified payment aggregator system cannot process the payment request.

8. The method as recited in claim 1, wherein determining that the payment aggregator system identified for the payment method option is unable to process the payment request further comprises determining that the identified payment aggregator system has failed to provide one or more transaction processing parameters.

9. The method as recited in claim 8, wherein the one or more transaction processing parameters comprise at least one of a transaction fee value or a transaction price point value.

10. The method as recited in claim 1, further comprising:

detecting a geographic location of a client device that sent the payment request; and wherein determining the plurality of payment method options comprises determining that the plurality of payment method options is associated with the detected geographic location.

11. A non-transitory computer-readable medium storing instructions that, when executed by at least one processor, cause a computer system to:

identify a plurality of payment method options;

identify one or more payment aggregator systems that correspond to each of the plurality of payment method options;

assign, by one or more server computing devices executing a network application, a percentage range of user identifiers to each of the one or more payment aggregator systems;

receive one or more payment requests to pay for one or more pending transactions, the one or more payment requests comprising a user identifier;

generate one or more transaction routing values for the one or more payment requests by hashing the user identifiers from the one or more payment requests with a hash function to calculate hashed user identifiers;

identify, for each of the one or more payment requests, at least one assigned payment aggregator system for processing the one or more payment requests based on mapping the hashed user identifier of the payment request to the percentage range in which the hashed user identifier falls;

provide an indication of the at least one assigned payment aggregator system in response to the payment request;

determine that the at least one assigned payment aggregator system is unable to process the one or more payment requests;

identify at least one backup payment aggregator system for processing the one or more payment requests; and return an indication of the at least one backup payment aggregator system as the indication of the at least one assigned payment aggregator system.

12. The non-transitory computer-readable medium as recited in claim 11, wherein the network application is a social networking system.

13. The non-transitory computer-readable medium as recited in claim 11, further comprising instructions that cause the computer system to:

generate a transaction routing table to store the percentage range of user identifiers assigned to each of the one or more payment aggregator systems; and wherein the instructions that cause the computer system to assign a percentage range of user identifiers to each of the one or more payment aggregator systems by evaluating one or more transaction metrics associated with each of the one or more payment aggregator systems.

14. The non-transitory computer-readable medium as recited in claim 13, wherein the one or more transaction metrics comprise at least one of a transaction fee, a transaction conversion rate, a reliability score, an availability score, or a profitability score.

15. The non-transitory computer-readable medium as recited in claim 11, wherein the instructions cause the computer system to determine that the at least one assigned payment aggregator system is unable to process the one or more payment requests by determining that the at least one assigned payment aggregator system has failed to provide one or more transaction processing parameters.

16. A system comprising:

one or more server computing devices executing a network application; and a non-transitory storage medium comprising instructions that, when executed by the one or more server computing devices, cause the system to:

receive a payment request to pay for a pending transaction, the payment request comprising a user identifier;

determine a plurality of payment method options;

generate a transaction routing value by hashing the user identifier with a hash function to calculate a hashed user identifier within a first range of numbers;

generate, for each payment method option of the plurality of determined payment method options, one or more transaction routing ranges associated with a plurality of payment aggregator systems by allocating the payment method option among one or more payment aggregator systems capable of processing the payment method option, wherein the one or more transaction routing ranges map to the first range of numbers;

determine, for each of the plurality of determined payment method options and by one or more server computing devices executing a network application, a payment aggregator system from the plurality of payment aggregator systems by mapping the hashed user identifier of the transaction routing value to a corresponding transaction routing percentage range of the one or more transaction routing ranges associated with the plurality of payment aggregator systems capable of processing each respective payment method option to identify the payment aggregator system;

provide, in response to the payment request, each of the plurality of determined payment method options along with an indication of the payment aggregator system identified for each of the determined payment method options;

determine, for a payment method option of the plurality of determined payment method options, that the payment aggregator system identified for the payment method option is unable to process the payment request;

identify, based on determining that the identified payment aggregator system is unable to process the payment request, a backup payment aggregator system for the payment method option that is able to process the payment request; and returning an indication of the backup payment aggregator system as the identified payment aggregator system to process the payment method option.

17. The system as recited in claim 16, wherein the instructions that, when executed by the one or more server computing devices, further cause the system to receive one or more transaction processing parameters associated with the plurality of payment method options.

18. The system as recited in claim 17, wherein the instructions that, when executed by the one or more server computing devices, further cause the system to:

detect a geographic location of a client device that sent the payment request;

identify a payment method option associated with the detected geographic location; and determine that a transaction processing parameter is associated with the identified payment method option.

19. The system as recited in claim 18, wherein the instructions that, when executed by the one or more server computing devices, further cause the system to order the plurality of determined payment method options based on the popularity of each of the plurality of determined payment method options in the detected geographic location.

20. The system as recited in claim 19, wherein the network application is a social networking system.

* * * * *